United States Patent
Nelson

(10) Patent No.: US 7,106,194 B2
(45) Date of Patent: Sep. 12, 2006

(54) METHOD FOR METAL OBJECT IDENTIFICATION USING A THREE-DIMENSIONAL STEERABLE MAGNETIC FIELD ANTENNA

(75) Inventor: Carl V. Nelson, Derwood, MD (US)

(73) Assignee: The Johns Hopkins University, Baltimore, MD (US)

(*) Notice: Subject to any disclaimer, the term of this patent is extended or adjusted under 35 U.S.C. 154(b) by 105 days.

(21) Appl. No.: 10/484,155

(22) PCT Filed: Nov. 13, 2002

(86) PCT No.: PCT/US02/36271

§ 371 (c)(1),
(2), (4) Date: Jan. 8, 2004

(87) PCT Pub. No.: WO03/044565

PCT Pub. Date: May 30, 2003

(65) Prior Publication Data

US 2004/0178794 A1  Sep. 16, 2004

Related U.S. Application Data

(60) Provisional application No. 60/332,290, filed on Nov. 16, 2001.

(51) Int. Cl.
*G08B 13/24* (2006.01)

(52) U.S. Cl. ............... 340/551; 340/552; 340/561; 340/568.1; 340/686.1; 340/825.36; 340/825.49; 324/323; 324/326; 324/329

(58) Field of Classification Search ............ 340/551, 340/568.1, 686.6, 691, 331, 825.36, 825.49, 340/552, 561, 668.6; 324/329, 326, 332, 324/344, 345, 323; 600/117, 407

See application file for complete search history.

(56) References Cited

U.S. PATENT DOCUMENTS

| | | | |
|---|---|---|---|
| 4,837,514 A | 6/1989 | Spies | |
| 4,872,018 A | 10/1989 | Feltz et al. | |
| 5,576,624 A | 11/1996 | Candy | |
| 5,726,628 A | 3/1998 | Yoo | |
| 5,767,669 A * | 6/1998 | Hansen et al. | 324/207.12 |
| 6,195,009 B1 | 2/2001 | Irizarry et al. | |
| 6,392,547 B1 | 5/2002 | Stewart et al. | |
| 6,541,966 B1 | 4/2003 | Keene | |
| 6,853,194 B1 * | 2/2005 | Nelson et al. | 324/329 |

FOREIGN PATENT DOCUMENTS

| | | |
|---|---|---|
| WO | WO 98/30921 | 7/1998 |
| WO | WO 01/84188 | 11/2001 |
| WO | WO 01/71387 | 9/2002 |

* cited by examiner

*Primary Examiner*—Hung Nguyen
(74) *Attorney, Agent, or Firm*—Francis A. Cooch

(57) ABSTRACT

A method for identifying a buried metal object using a three-dimensional steerable magnetic field (3DSMF) system. The method comprises generating a magnetic field vector (MFV) at a first MFV position above the buried metal object; measuring a time decay response at the first MFV position; generating a MFV at a next MFV position above the buried metal object; measuring a time decay response at the next MFV position; repeating the above steps until a complete 360-degree measurement of time decay responses of the buried metal object is completed; processing all measured time decay responses with a target search algorithm to determine a magnetic polarizability tensor of the buried metal object; and identifying the buried metal object by matching the magnetic polarizability tensor of the buried metal object to a known magnetic polarizability tensor of an object.

15 Claims, 18 Drawing Sheets

Time decay response of Al soda can and Val59 AP mine normalized at 15 ms.

Bx as a function of x at center of antenna.

Plot of Bx angle as a function of x for different heights, z = 20 cm, 30 cm, and 50 cm, above the plane of the antenna.

HMF and loop antenna comparison, log-linear plot of Bx, Bz versus distance, normalized at 10 cm.

3-D sectional plot of Bx using Vector Fields magnetic simulation program.

Conceptual view of magnetic field surrounding a loop antenna.

Conceptual view of magnetic field surrounding an HMF antenna.

Top View

Time decay response from #22 AWG calibration loop at different axis angles.

Time decay response of Al soda can and Val59 AP mine normalized at 15 ms.

Magnetic Field

Original data collection, data not in standard form.

|     | α1  | α2  | ... | ... | ... | ... | αm  |
| --- | --- | --- | --- | --- | --- | --- | --- |
| θ1  | τ11 | τ12 |     |     |     |     |     |
| θ2  | τ21 |     |     |     |     |     |     |
| ..  |     |     |     |     |     |     |     |
| ..  |     |     |     |     |     |     |     |
| ..  |     |     |     |     |     |     |     |
| ..  |     | τmax |    |     |     |     |     |
| θn  |     |     |     |     |     |     | τnm |

FIG. 24A

Data after matrix rotation, data in standard form. Note new angles.

|     | α'1 | α'2 | ... | ... | ... | ... | α'm |
| --- | --- | --- | --- | --- | --- | --- | --- |
| θ'1 | τ11 | τ12 |     |     |     |     |     |
| θ'2 | τ21 |     |     |     |     |     |     |
| ..  |     |     |     |     |     |     |     |
| ..  |     |     |     | τmax |    |     |     |
| ..  |     |     |     |     |     |     |     |
| ..  |     |     |     |     |     |     |     |
| θ'n |     |     |     |     |     |     | τnm |

FIG. 24B

METHOD FOR METAL OBJECT IDENTIFICATION USING A THREE-DIMENSIONAL STEERABLE MAGNETIC FIELD ANTENNA

CROSS-REFERENCE TO RELATED APPLICATIONS

This application is a 371 of PCT/US02/36271 filed on Nov. 13, 2002 which is a DIV of Ser. No. 60/332,290 filed on Nov. 16, 2001.

BACKGROUND OF THE INVENTION

1. Field of the Invention

The present invention relates to detecting and identifying metal targets in general and, more particularly, to a method for utilizing a steerable three-dimensional magnetic field sensor system to detect and identify metal targets, such as unexploded ordnance (UXO), underground utilities, high metal content landmines and low metal content landmines buried in the soil (or visually obscured) based on the electromagnetic response of the target to a time-domain wide bandwidth electromagnetic spectrum.

2. Description of the Related Art

Most electromagnetic induction (EMI) metal detectors use a loop antenna to create a magnetic field in the vicinity of a metal target for the purposes of detection and identification. One of the most important functions of a magnetic field antenna is to project a strong magnetic field at the site of the target.

Typical loop antennas are formed of multiple turns of wire around a central axis. The magnetic field strength of a loop antenna is a strong function of distance from the antenna. Far from the antenna, along the axis of the loop antenna, the field strength varies approximately as $1/r^3$, where r is the distance from the plane of the loop to the object. Off-axis, the antenna field strength and direction tends to be a very complex function of position, with the field intensity very strong near the wires in the loop and weaker near the center of the loop.

One of the consequences of the loop antenna's complex spatial field strength is the fact that a metal target is excited with a complex magnetic field. When a buried target of unknown depth is scanned with an EMI sensor, the spatial distribution of the excitation magnetic field at the target is not known. Some target identification algorithms assume that the target is excited with a uniform magnetic field. If the magnetic field is in fact complex, the target's time or frequency response to the field is not well characterized. This may tend to complicate or confound a target identification algorithm.

In addition, with the target at the center of the loop, the loop magnetic field antenna only measures the vertical component of a target's decay response.

In the time domain, a metal target can be modeled by defining a magnetic polarizability tensor:

$$\vec{M} = \begin{pmatrix} M_x(t) & 0 & 0 \\ 0 & M_y(t) & 0 \\ 0 & 0 & M_z(t) \end{pmatrix}$$

where the diagonal components of the tensor are the time responses of the target to excitations in an orthogonal reference frame centered on the target. There exists a complimentary frequency domain version of the above equation. Models of this nature generally assume that the excitation field strength is uniform over the target's volume. For a loop antenna oriented directly over a target, the antenna only excites the vertical component of the target's time decay response, $M_z(t)$. For accurate target classification, it is necessary to measure all three components of a target's magnetic polarizability tensor.

Recently, a steerable three-dimensional magnetic field sensor system has been developed that can project a strong magnetic field deeply into the ground; excite the target with a uniform magnetic field; and measure the three-dimensional components of the target's magnetic polarizability tensor (see International Application No. PCT/US01/13933, filed Apr. 30, 2002 and entitled Steerable Three Dimensional Magnetic Field Sensor System For Detection And Classification Of Metal Targets, the contents of which are incorporated by reference herein in its entirety). As noted above, prior art EMI metal detectors that use loop magnetic field antennas do not address all of these issues.

Accordingly, a need exists for a method of effectively utilizing the above-mentioned steerable three-dimensional magnetic field sensor system in an efficient manner and classifying (e.g., identify the type of) a metal target located below a surface.

SUMMARY OF THE INVENTION

It is, therefore, an object of the present invention to provide a method for identifying a buried metal object using a three-dimensional steerable magnetic field (3DSMF) antenna.

It is another object of the present invention to provide a more efficient method for identifying a buried metal object with a body of revolution (BOR) using a three-dimensional steerable magnetic field (3DSMF) antenna.

It is yet another object of the present invention to provide a more efficient method utilizing a primary axis estimation for identifying a buried metal object with a body of revolution (BOR) using a three-dimensional steerable magnetic field (3DSMF) antenna.

To achieve the above and other objects, the present invention provides a steerable three-dimensional (3-D) magnetic field sensor system for detection and classification of hidden or obscured metal targets. The steerable 3-D magnetic field sensor system measures the horizontal and vertical components of a metal target's eddy current time decay signature. Instead of creating a vertical magnetic field from a horizontal loop transmitter configuration used by most prior art EMI metal detectors, the transmitter geometry of the sensor system's antenna is designed for creating horizontal and vertical magnetic fields and for steering the same. Two horizontal magnetic field (HMF) antennas and a vertical loop electromagnetic field antenna are combined to form the steerable 3-D magnetic field sensor system.

One of the potential advantages of the steerable 3-D magnetic field sensor system is the relatively uniform magnetic field that is created over a large volume by the HMF antennas. A second potential advantage of the EMI sensor system is that compared to a conventional loop antenna, the magnetic field intensity falls off slowly with distance from the plane of the antenna. These two advantages potentially make the steerable 3-D magnetic field sensor system well suited for detection and classification of metal targets buried deeply in the ground (e.g., landmines, unexploded ordnance (UXO) and underground utilities).

A first preferred method for identifying a buried metal object using a three-dimensional steerable magnetic field (3DSMF) antenna according to the present invention, comprises: (a) generating a magnetic field vector (MFV) at a first MFV position above the buried metal object; (b) measuring a time decay response at the first MFV position; (c) generating a MFV at a next MFV position above the buried metal object; (d) measuring a time decay response at the next MFV position; (e) repeating steps (c) and (d) until a complete three-dimensional measurement of time decay responses of the buried metal object is completed; (f) processing all measured time decay responses with a target search algorithm to determine a magnetic polarizability tensor of the buried metal object; and (g) identifying the buried metal object by matching the magnetic polarizability tensor of the buried metal object to a known magnetic polarizability tensor of an object.

A second preferred method for identifying a buried metal object with a body of revolution (BOR) using a three-dimensional steerable magnetic field (3DSMF) antenna according to the present invention, comprises: (a) generating a magnetic field vector (MFV) at a first MFV position above the buried metal object; (b) measuring a time decay response at the first MFV position; (c) generating a MFV at a next MFV position above the buried metal object; (d) measuring a time decay response at the next MFV position; (e) repeating steps (c) and (d) until a predetermined range of measurements of time decay responses of the buried metal object is completed; (f) estimating a primary axis of the buried metal object from the predetermined range of measurements of time decay responses of the buried metal object; (g) refining the primary axis by generating and measuring additional MFVs and time decay responses, respectively, around the estimated primary axis; (h) generating a MFV at a first MFV position 90 degrees to the refined primary axis; (i) measuring a time decay response at the first MFV position 90 degrees to the refined primary axis; (j) generating a MFV at a next MFV position 90 degrees to the refined primary axis; (k) measuring a time decay response at the next MFV position; (l) repeating steps (j) and (k) until a predetermined number of measurements of time decay responses 90 degrees to the refined primary axis of the buried metal object is completed; (m) testing the predetermined number of measurements of time decay responses 90 degrees to the refined primary axis of the buried metal object for symmetry; and (n) if the predetermined number of measurements of time decay responses 90 degrees to the refined primary axis of the buried metal object are symmetrical, identifying the buried metal object by matching one of the predetermined number of measurements of time decay responses 90 degrees to the refined primary axis of the buried metal object to a known magnetic polarizability tensor of an object.

A third preferred method for identifying a buried metal object with a body of revolution (BOR) using a three-dimensional steerable magnetic field (3DSMF) antenna according to the present invention, comprises: (a) generating a magnetic field vector (MFV) in an X-direction, a Y-direction, and a Z-direction above the buried metal object; (b) measuring a time decay response in the X-direction, the Y-direction, and the Z-direction; (c) estimating a primary axis of the buried metal object from the measured time decay responses in the X-direction, the Y-direction, and the Z-direction; (d) refining the primary axis by generating and measuring additional MFVs and time decay responses, respectively, around the estimated primary axis; (e) generating a MFV at a first MFV position 90 degrees to the refined primary axis; (f) measuring a time decay response at the first MFV position 90 degrees to the refined primary axis; (g) generating a MFV at a next MFV position 90 degrees to the refined primary axis; (h) measuring a time decay response at the, next MFV position 90 degrees to the refined primary axis; (i) repeating steps (g) and (h) until a predetermined number of measurements of time decay responses 90 degrees to the refined primary axis of the buried metal object is completed; (j) testing the predetermined number of measurements of time decay responses 90 degrees to the refined primary axis of the buried metal object for symmetry; and (k) if the predetermined number of measurements of time decay responses 90 degrees to the refined primary axis of the buried metal object are symmetrical, identifying the buried metal object by matching one of the predetermined number of measurements of time decay responses 90 degrees to the refined primary axis of the buried metal object to a known magnetic polarizability tensor of an object.

BRIEF DESCRIPTION OF THE DRAWINGS

The above and other objects, features, and advantages of the present invention will become more apparent from the following detailed description when taken in conjunction with the accompanying drawings in which:

FIGS. 24A and 24B are charts illustrating time decay measurements as a function of angular measurement.

DESCRIPTION OF THE PREFERRED EMBODIMENTS

A discussion is first made as to the underlying physics utilized by a horizontal magnetic field (HMF) sensor system of the present invention. Following this discussion, a description is provided of the steerable two-dimensional HMF sensor system followed by a discussion of experimental data demonstrating the sensor system's capabilities. Following this discussion, a description is provided of the steerable 3-D magnetic field sensor system, which includes two HMF antennas and a vertical loop electromagnetic antenna. Finally, a description will be provided of preferred methods of utilizing the steerable 3-D magnetic field sensor system to classify/identify a metal object.

I. HMF Antenna Model

The innovative invention of the HMF antenna is an important concept of the present invention. As such, it is beneficial to review the basic physics of the innovative HMF antenna so that the advantages of such a magnetic field antenna and magnetic field receivers can be appreciated.

Reviewing a basic physics textbook, one of the first geometries a student is asked to solve is the "sheet current" problem. The textbook problem and its solution very clearly describes the present antenna's configuration. The problem: "Long, straight conductors with square cross-section and each carrying current I are laid side by side to form an infinite current sheet. The conductors lie in the xy-plane, are parallel to the y-axis, and carry current in the +y direction. There are n conductors per meter of length measured long the x-axis." For an infinite conducting sheet, the field is in the x direction and there is no magnetic field variation in the z direction; the field is constant and is given by:

$$B = \mu_0 n \, I/2 \quad (1)$$

where I is the current in the wire and n is the number of wires per meter of length measured along the x-axis.

Expressed another way, the sheet current is a horizontal magnetic field (HMF) generator or antenna. The important feature of Equation (1) is the fact that the magnetic field is constant with z, the distance from the plane of the HMF antenna. Equation (1) forms the basis of the present magnetic field antenna. The objective is to create an approximation to an infinite sheet current and the magnetic field will have a relatively uniform shape and a slow magnetic intensity fall-off with distance from the plane of the HMF antenna. Additionally, the unique character of this HMF allows the present invention to use unique magnetic field receiver configurations that enhance the time-domain performance of the sensor system compared to a conventional loop EMI sensor system.

Figure 1:
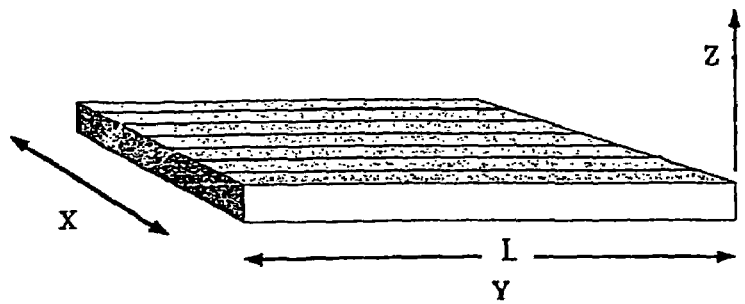
FIG. 1 is a diagram illustrating the antenna geometry of a horizontal magnetic field (HMF) antenna of a steerable electromagnetic induction (EMI) sensor system according to the present invention.

Preliminary HMF antenna modeling uses the simplified geometry of FIG. 1. Using the Biot-Savart Law, the approximate x and z components of the magnetic field can be written as:

$$B_x = \frac{\mu_0 I \, z0}{4\pi} \sum_{n=0}^{N} \left( [z0^2 + (x0 - n\Delta x)^2]^{-1} \right. \quad (2)$$
$$\left. \left[ \frac{(L - y0)}{\sqrt{(L - y0)^2 + z0^2 + (x0 - n\Delta x)^2}} + \frac{y0}{\sqrt{y0^2 + z0^2 + (x0 - n\Delta x)^2}} \right] \right)$$

$$B_z = \frac{\mu_0 I}{4\pi} \sum_{n=0}^{N} \left( (x0 - n\Delta x)[z0^2 + (x0 - n\Delta x)^2]^{-1} \right.$$
$$\left. \left[ \frac{(L - y0)}{\sqrt{(L - y0)^2 + z0^2 + (x0 - n\Delta x)^2}} + \frac{y0}{\sqrt{y0^2 + z0^2 + (x0 - n\Delta x)^2}} \right] \right)$$

where N is the number of current elements (wires) carrying current I, $\Delta x$ is the wire separation, L is the length of the HMF antenna, and X0, Y0 and Z0 are the location of the magnetic field measurement points in space. For this preliminary modeling effort, the return path of the current is ignored. The current return path is important and when constructing the actual HMF antenna, the return current path can be placed at a relatively large distance to the nominal detection area. The true Bx component of the magnetic field will be slightly distorted from the values generated by the present calculations. The magnetic field distorting caused by the actual return path of the wires can be controlled for the desired field uniformity by moving the wires far from the detection area or by adding magnetic shielding to the return path wires. In any case, the magnetic field distortions are an order of magnitude smaller than the spatial field distortion of a loop antenna. In addition, with the simple geometry of a plane set of wires, there is no By component of the magnetic field.

Calculations using Equation (2) were made with the following antenna parameters: X=100 cm, L=300 cm, N=50 and $\Delta x$=2 cm. These parameters were selected for a conceptual application of an HMF sensor mounted on a UXO survey cart similar to the United States Navy's Multi-sensor Towed Away Detection System (MTADS). MTADS uses three EM metal detectors, with 1 m diameter loop antennas to cover a 3 meter wide search area. The MTADS is designed to search and identify buried UXO.

Figure 2:
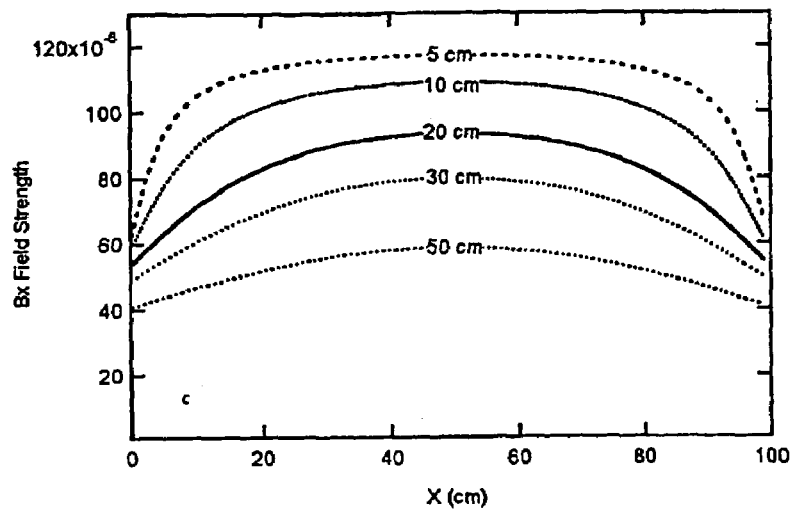
FIG. 2 is a chart showing the angle of Bx as a function of x at the center of the HMF antenna for different distances from the plane of the HMF antenna in the Z direction.

FIG. 2 is a plot of Bx versus x at the center of the HMF antenna (y=150 cm) for different distances from the plane of the HMF antenna in the z direction. Note that the field intensity is relatively uniform except close to the edge of the HMF antenna. For a particular application depth, the HMF antenna parameters can be adjusted for the desired Bx field uniformity.

Figure 3:
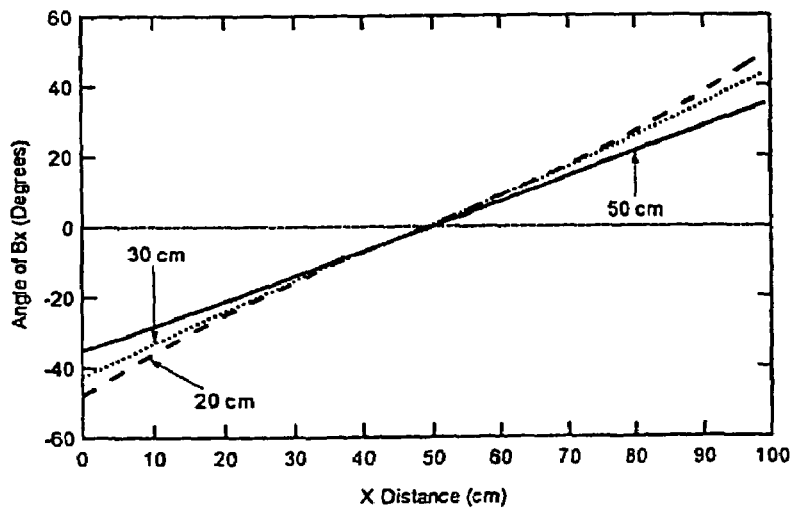
FIG. 3 is a chart showing the angle of Bx as a function of x for different heights above the plane of the HMF antenna.

FIG. 3 shows the angle of Bx as a function of x (cross antenna track). It is noted that if a receiver coil is placed at the center of the HMF antenna in the plane of the HMF antenna, there is no net flux through the receiver coil. The Bz components of the magnetic field cancel. This implies that a horizontal receiver coil so placed will, to first order, not "see" the turn-off transients of a pulsed time-domain version of the sensor. This also implies that an HMF antenna could potentially be used in a frequency domain sensor system, since the coupling between the transmitter and receiver are minimized.

Figure 4:
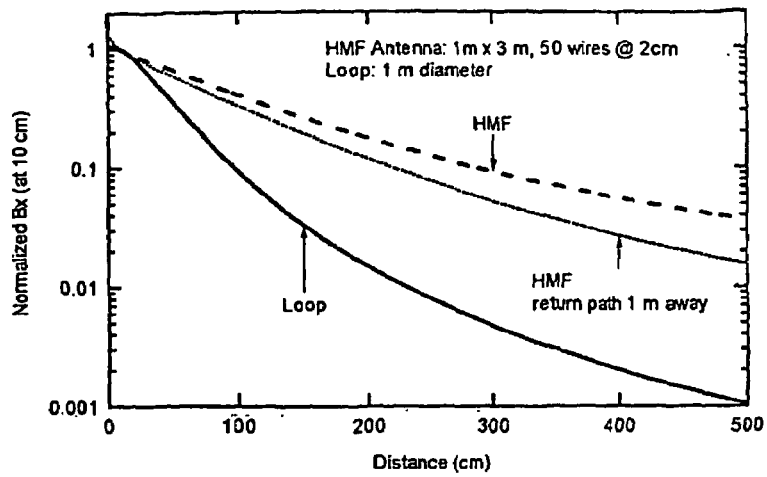
FIG. 4 is a log-linear chart that compares Bx from HMF antenna according to the present invention to Bz of a prior art loop antenna versus distance from the plane of the HMF antenna.

FIG. 4 is a log-linear plot that compares Bx from the HMF antenna (1 m by 3 m) to Bz of a prior art loop antenna (1 m diameter) versus distance from the plane of the HMF antenna of the present invention. The magnetic fields from each antenna have been normalized to 1 at a depth of 10 cm to show the relative field intensity fall-off with distance. The calculations were made along the centerline of each antenna.

Over the depth range of 10 cm to 500 cm, FIG. 4 shows that the HMF antenna field strength varies by approximately a factor of 30, while over the same distance range, the loop antenna varies by a factor of 1000. Also shown in FIG. 4 is a third curve of an HMF antenna with a return current path 1 m away from the primary antenna surface. The Bx field strength is lower than the HMF field without the return path, but the field still falls off more slowly than the loop antenna. Over the distance range of 10 cm to 500 cm, the HMF antenna field strength with a return path included varies by approximately a factor of 60. This is still much less than the prior art loop antenna value of 1000. Increasing the return path separation distance or using some form of magnetic shielding will reduce the return path effect even more.

Figure 5:
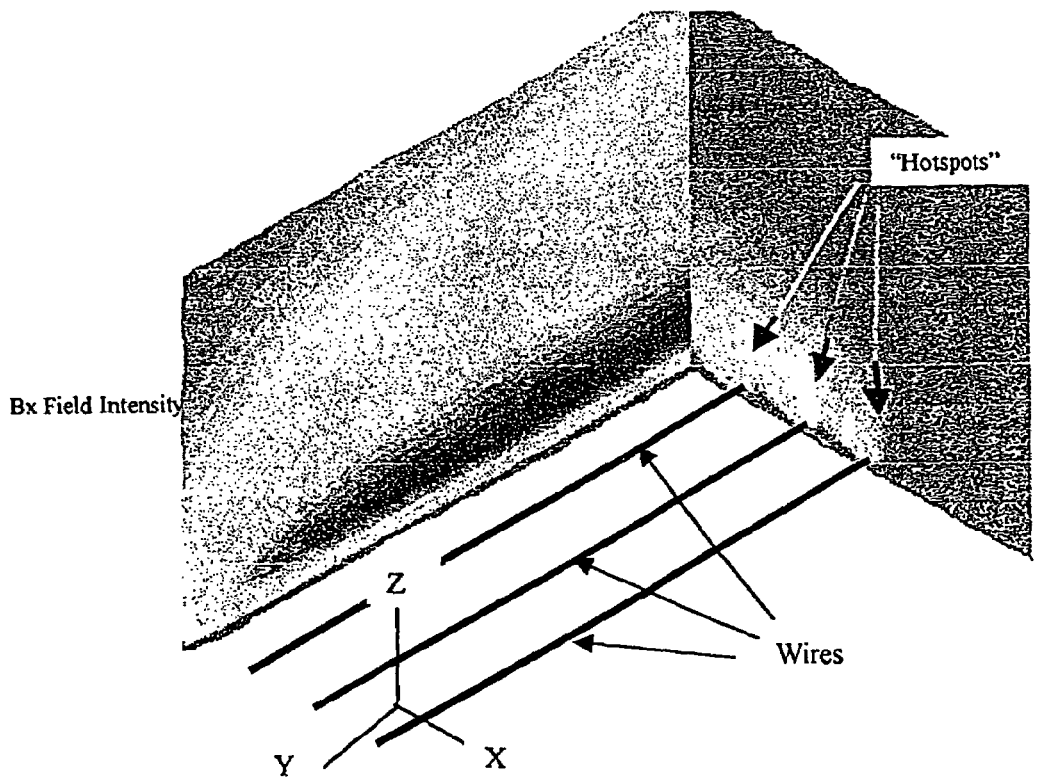
FIG. 5 illustrates a three-dimensional plot of Bx surrounding the HMF antenna of the present invention.

FIG. 5 shows a three-dimensional (3-D) plot of Bx surrounding the HMF antenna. Note that the field in both the x and y directions is relatively uniform, except near the current carrying wires and edges of the HMF antenna. As one would expect, the field near the wires is very intense, causing local "hot spots."

Figure 6A:
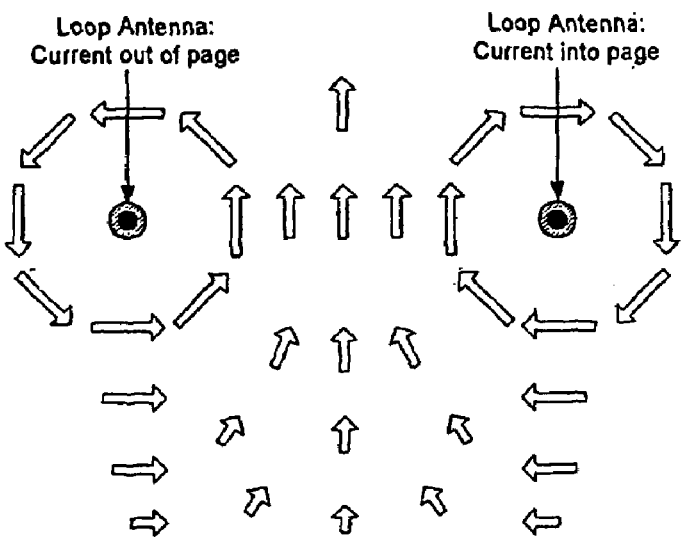
FIGS. 6A and 6B illustrate the field distribution from the prior art loop antenna and the HMF antenna of the present invention, respectively.
Figure 6B:
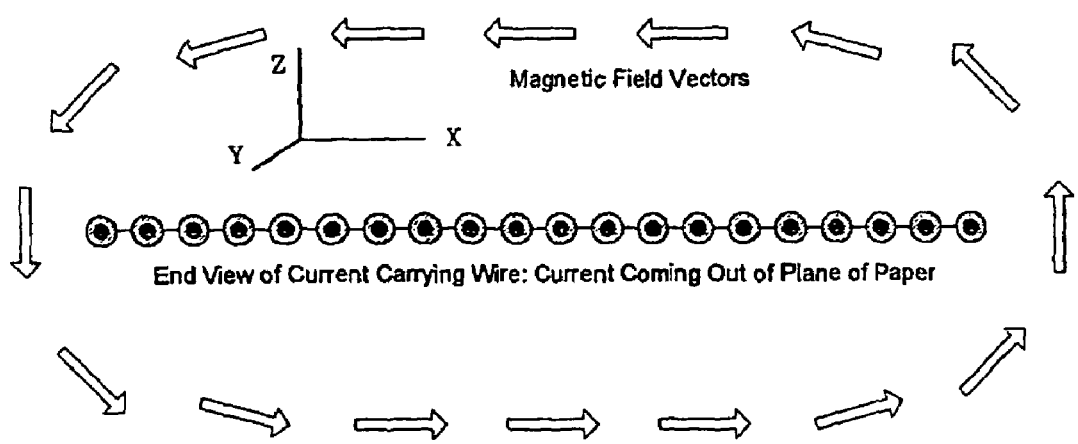

Another way to view the field distribution from the loop and HMF antennas is shown in FIGS. 6A and 6B. Here, we have a simplified conceptual diagram of the magnetic field vectors from the different antennas. FIG. 6A shows the magnetic field surrounding a simple loop antenna looking from the side. The field is relatively uniform in the center of the antenna and is oriented in the vertical direction. As we move away from the plane of the loop in the −z direction, the field continues to be vertical along the axis, but off-axis the field has a more complex shape. The field is approximately horizontal under the loop conductors.

FIG. 6B shows the magnetic field surrounding the HMF antenna looking down the current carrying wires. The current carrying wires are perpendicular to the plane of the paper and the current direction is out of the paper. In the region near the center of the HMF antenna, the magnetic field is in the horizontal direction. As one moves from the center of the HMF antenna, the field becomes more complex, with Bz starting to dominate at the edge. However, as FIGS. 2 and 5 show, the field remains relatively uniform in the x direction.

II. Sensor System Description

The steerable 3-D magnetic field sensor system is composed of three subsystem components: (1) two identical time-domain HMF electromagnetic sensor subsystems, each producing an HMF at right angles to each other; and (2) a conventional horizontal loop antenna magnetic field sensor system that produces a vertical magnetic field. Each HMF subsystem in turn is composed of two basic components: (1) the HMF antenna and (2) the magnetic field receiver.

A magnetic field is a vector quantity. It has magnitude and direction and can be decomposed into individual components in an orthogonal coordinate system. For example, in a Cartesian coordinate system of X, Y and Z, a magnetic field vector can be represented by Bx, By and Bz. If we generate in the same volume (spatial region) a magnetic field in the X direction, Bx; generate a magnetic field in the Y direction, By; and generate a magnetic field in the Z direction, Bz, the individual magnetic field components combine to form a new magnetic field that has a magnitude and direction given by:

$$|\vec{B}| = \sqrt{B_x^2 + B_y^2 + B_Z^2}$$

$$\theta = \tan^{-1}\left[\frac{B_y}{B_X}\right]$$

$$\delta = \tan^{-1}\left[\frac{B_z}{\sqrt{B_x^2 + B_y^2}}\right]$$

where θ is the angle measured from the x axis in the XY plane and δ is the angle from the XY plane to the B vector.

By varying the magnitude of the three magnetic field components, a magnetic field can be projected in any direction. A X direction magnetic field is generated by a X directed HMF antenna, a Y direction magnetic field is generated by a Y directed HMF antenna, and a Z direction magnetic field is generated by a Z directed horizontal loop antenna. Combining all three antennas, a 3-D magnetic field sensor system of the present invention is created.

The details of the HMF subsystem is described first. Later, the use of two HMF subsystems and the vertical magnetic field sensor (horizontal loop) will be described that show the creation of the steerable 3-D magnetic field sensor system.

Figure 7:
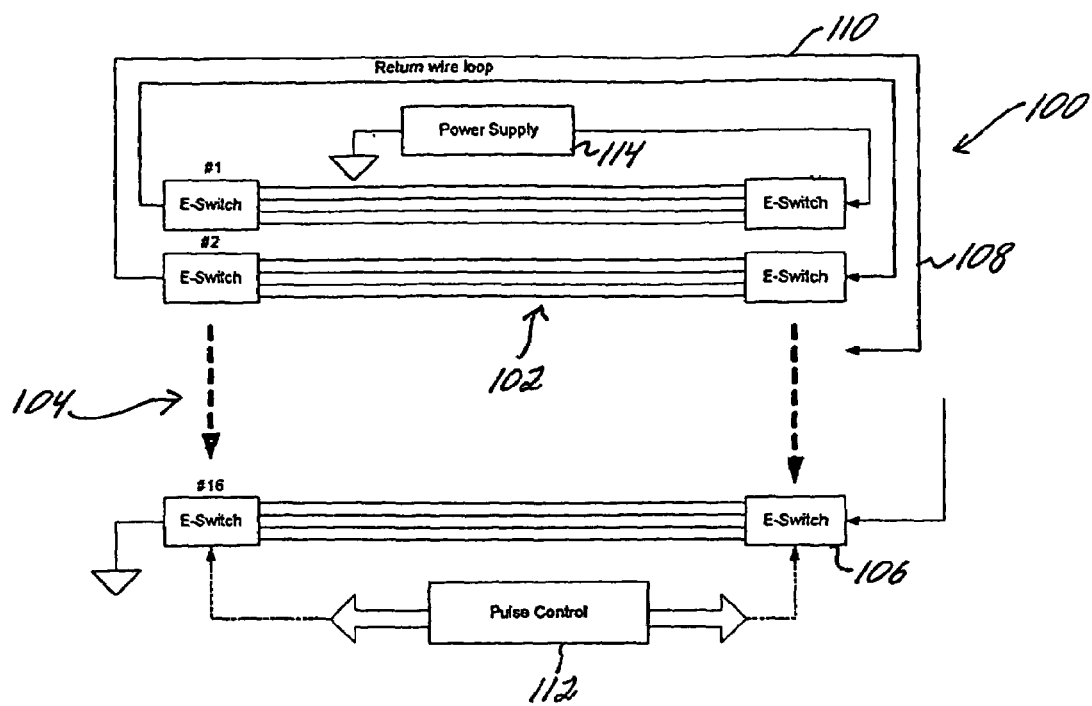
FIG. 7 is a block diagram of the HMF antenna according to the present invention.

FIG. 7 is a simplified block diagram of the HMF sensor system designated by reference numeral 100 according to the present invention. An approximation to a sheet current is created by a series of closely spaced parallel wires 102. These wires form the active surface of the HMF antenna 104. The closely spaced parallel wires 102 are connected to high-speed electronic switches (E-Switch) 106.

Return current wire segments 108 of wires 102 exit the E-Switches 106 in a direction perpendicular to the plane of the HMF antenna 104. The circuit is completed with a set of parallel return wire segments 110 relatively far away from the active surface of the HMF antenna 104. As noted above, the return wire segments 110 of wires 102 complicate the exact magnetic field geometry of the HMF antenna 104, but close to the center of the active surface of the HMF antenna 104, the horizontal component of the magnetic field dominates the other components.

A preferred embodiment of the sensor system is described. The current in the HMF antenna 104 is controlled by the high speed E-Switches 106 operating in parallel. The E-Switches 106 are electronic relays with very fast turn-off times, preferably constructed using insulated gate, bipolar transistors in a floating configuration. One skilled in the art can construct the E-Switch 106. Opto-isolators are used to couple the E-Switches 106 to the ground-referenced pulse control circuitry 112.

The HMF magnetic field sensor system 100 is preferably configured so that a single power supply 114 provides current to the HMF antenna 104. It is understood that a different power supply arrangement could be used that satisfied specific application requirements. For example, the present embodiment requires a relatively high voltage and high current power supply to drive the chain of E-Switches 106. Multiple lower voltage and/or lower current power supplies could be employed that have the same desired magnetic field characteristics. Also, the power supplies could be configured so that different current is flowing through different portions of the HMF antenna wires. Using different current levels in different parts of the HMF antenna 104 allows one to tailor the spatial character of the magnetic field.

The E-Switches 106 turn-off the antenna current in less than about 400 ns (90% to 10% amplitude). To reduce the number of E-Switches 106, each E-Switch 106 controls four closely spaced parallel wires 102. It is understood that the number of wires controlled by the E-Switches 106 is only limited by the exact electrical characteristics of the E-Switches 106 and the electrical properties of the wires (e.g., resistance, inductance and capacitance). More or less wires could be connected to the E-Switches 106 depending on the application.

Two banks 116 (see FIG. 8) of 16 E-Switches 106 control 64 parallel wires 102 forming the active surface of the HMF antenna 104. The size of the HMF antenna 104 is approximately 80 cm by 180 cm and the parallel wires 102 are spaced about 1.3 cm apart.

Figure 9:
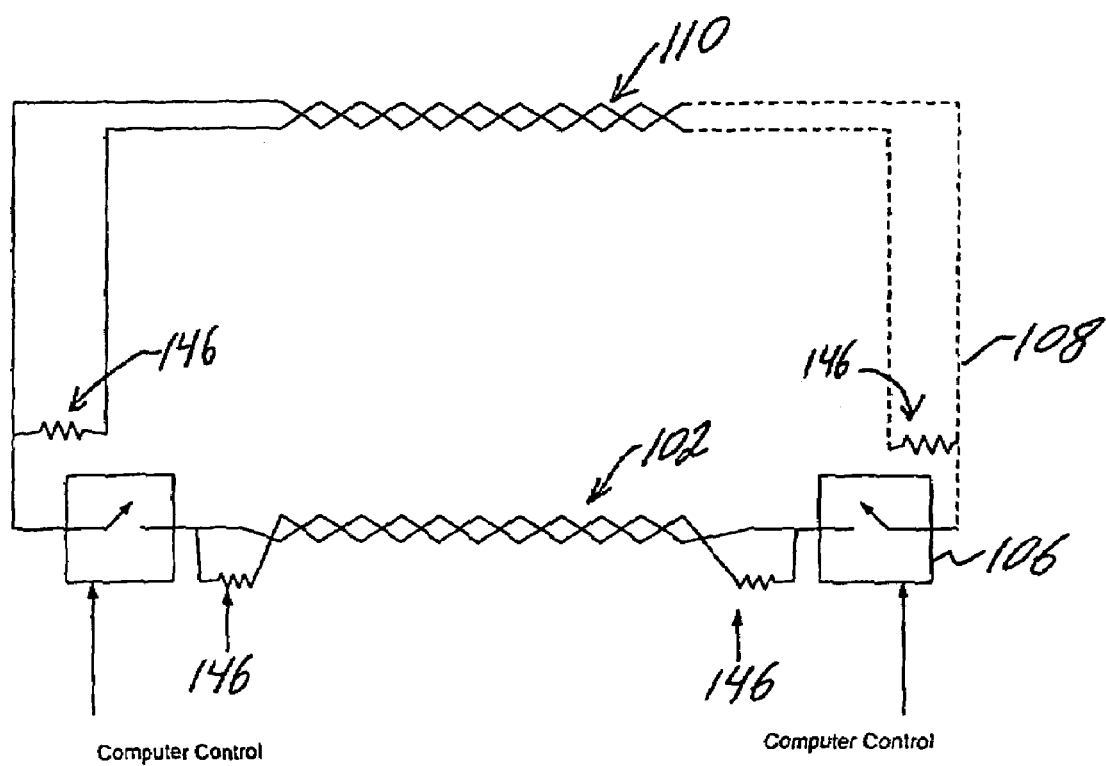
FIG. 9 is a diagram illustrating the HMF antenna having twisted return wires, twisted parallel wires and damping resistors.

FIG. 9 is a diagram illustrating a wiring configuration of the HMF antenna 104 having twisted parallel wires 102, twisted return wires 110 and damping resistors 146. FIG. 9 only shows one twisted parallel wire 102 and one twisted return wire 102 for clarity. It is to be appreciated that all the parallel wires 102 and all return wires 110 are twisted. E-Switches 106 are provided to control the antenna current flow. When the E-Switch 106 goes from a closed position (current flowing in loop) to an open position, a damping resistor 146 placed across the loop dampens the current as quickly as possible without circuit oscillation or a long decay time (critically damped).

The inventive arrangement of wires and damping resistors 146 minimizes circuit oscillation, minimizes the time for current damping and minimizes the magnetic field collapse time. In a time-domain metal detection sensor, the sooner the primary excitation magnetic field disappears, the sooner the small eddy currents from the target can be measured. The decay of the primary magnetic field is governed by the decay of the current in the wire after the switch is opened.

Ignoring capacitive effects, the decay time on the loop is given by L/R, where L is the inductance of the loop and R is the resistance of the loop. Minimizing L and making R as large as possible without causing oscillation minimizes the decay of the current in the loop and therefore, the presence of the primary excitation magnetic field. Breaking the loop up into segments as shown in FIG. 9 reduces the L of the segment. Having a return wire 110 between the two switches 106 allows a damping resistor 146 to be placed across the wire segment, therefore, damping the inductance of that wire segment.

FIG. 9 shows two damping resistors 146. Although not necessary for the operation of the damping function, using two resistors 146 add symmetry to the damping function. In wide-bandwidth circuits, symmetric circuit layouts work more effectively. The HMF antenna arrangement also works with just one E-Switch 106 controlling the section of wires, but less effectively. Additionally, a single resistor could be used for all the wires controlled by the E-Switch 106.

III. Experimental Results

III.1 Experimental Setup

Figure 8:
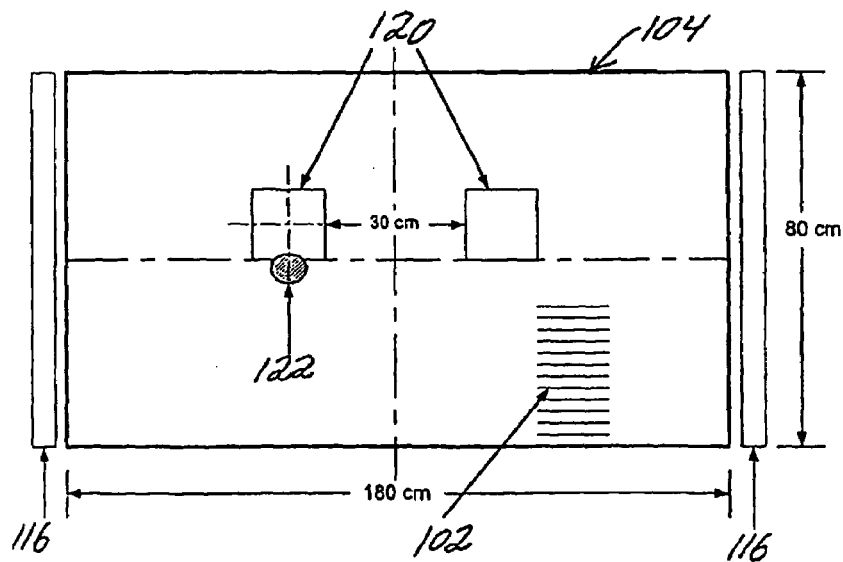
FIG. 8 is a diagram of an experimental setup for performing test target measurements using the HMF antenna of the present invention.

Experiments were conducted to validate the operation of the HMF sensor system. FIG. 8 shows a diagram of the experimental setup (top view) for the test target measurements. Two 15 cm by 15 cm, 16-turn printed circuit board receiver coils 120 were placed near the center of the HMF antenna 104. The receiver coils 120 were connected in a differential arrangement to subtract any residual coupled antenna decay current and far-field electrical noise.

Test targets 122 were placed directly over one edge of the receiver coil 120 as shown in FIG. 8. The receiver signal was amplified by a wide-bandwidth, multi-stage differential amplifier (not shown). The output of the amplifier was digitized with a data acquisition system mounted in a personal computer.

III.2 Target Responses

To validate the sensor system's ability to accurately measure time decay responses from metal targets, the sensor system 100 was tested with a calibration loop. A thin-wire loop can be modeled with a single exponential decay parameter that can be calculated analytically from theory.

A calibration loop was formed from a single turn of #22AWG (American Wire Gauge) copper wire with a diameter of 10.1 cm. The loop was placed in three orientations over the sensor system 100: the axis parallel to the plane of the HMF antenna 104 (i.e., maximum coupling to Bx flux) at z=10 cm; the axis 45 degrees to the plane of the HMF antenna 104 with center of loop at z=10 cm; and the axis perpendicular to the plane of the HMF antenna 104 with center of loop at z=10 cm.

Figure 10:
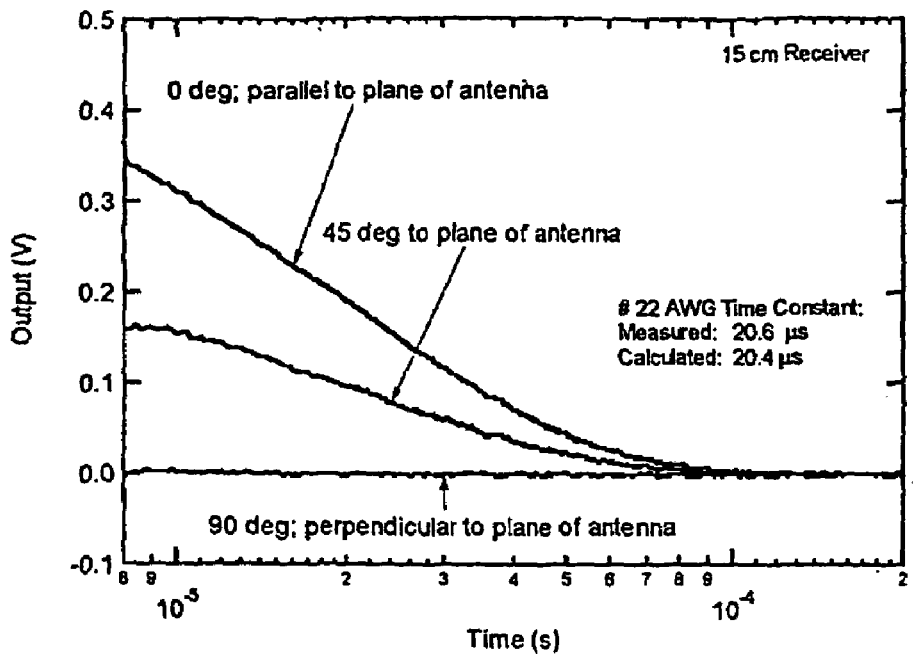
FIG. 10 is a chart showing time decay response data from a calibration test over a time period.

FIG. 10 shows time decay response data from the calibration test over the time period of 8 μs to 200 μs. A nonlinear least-squares method was used to fit the wire loop time decay response data to a single exponential-term equation over the time range of 10 μs to 50 μs. The calculated time decay of the wire loop is 20.4 μs and compares favorably with the measure time decay of 20.6 μs for both the parallel and 45 degree orientations. The results of the time constant calibration gives confidence that the sensor system 100 measures accurate target time decay responses.

FIG. 10 shows three features of the target responses as measured by the sensor system 100:

First, while the amplitude of the time decay response may change due to the different flux coupling between the HMF antenna 104 and receiver unit 120, the time decay does not. The 0° and 45° time decay responses are the same.

Second, when the loop target axis is perpendicular to the HMF antenna 104, the response is approximately zero. When the calibration loop is oriented in this fashion, there is approximately zero flux coupling from the HMF antenna 104 into the loop. Therefore, there is no flux change to excite eddy currents. This result validates the idea that the primary magnetic field component, at this location over the HMF antenna 104, is horizontal.

Third, target time decay response can be measured relatively close to the antenna turn-off time.

Figure 11:
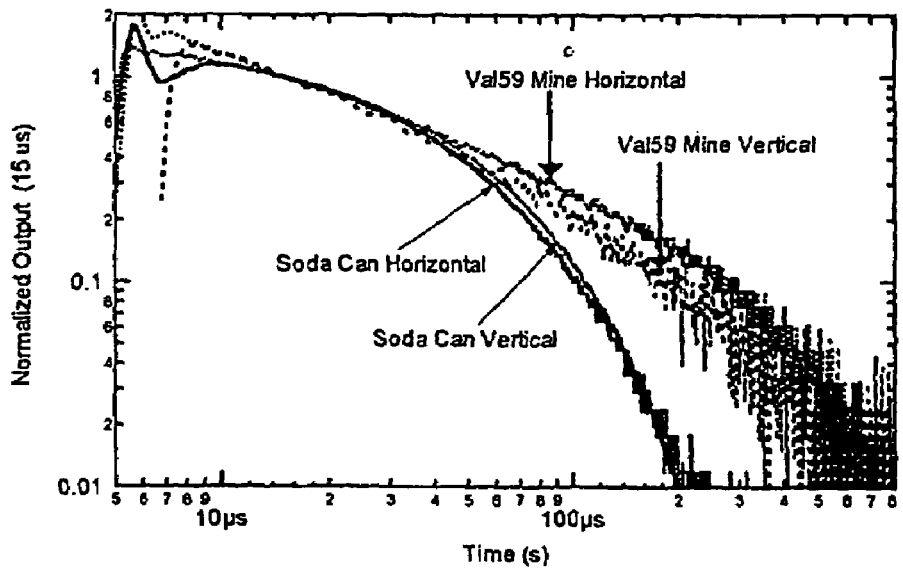
FIG. 11 is a log-log chart of data from an aluminum soda can and a Val 59 metal anti-personnel (AP) mine taken approximately 15 cm above the HMF antenna.

The time decay data in the time region between 0 µs and 8 µs is not shown in FIG. 10, since the receiver unit 120 was either in saturation or was oscillating. FIG. 11 shows some of these sensor artifacts in the time region of 5 µs to 8 µs. It is contemplated to use a higher bandwidth and wider dynamic range magnetic field antenna to measure target time decay closer to the antenna turn off time. This would enable the detection of low metal content targets, since such targets have a fast time decay response. Since the HMF antenna turns off in less than 1 µs, the performance (i.e., increased bandwidth) of the sensor system can be improved by using higher frequency receiver coils or higher bandwidth magnetic sensors.

The primary objective of the HMF sensor system 100 is target identification and classification based on eddy current time decay. With this objective in mind, FIG. 11 presents preliminary time decay response data from two different targets at two different orientations to the HMF antenna plane. The absolute amplitude of the target time decay response does not govern the target characterization process. Therefore, in order to show more clearly the differences in the relative time decay responses of different targets with large differences in absolute amplitude, the time decay data amplitudes have been normalized to 1 at 15 µs. FIG. 11 is a log-log plot of data from an aluminum soda can and a Val 59 metal anti-personnel (AP) mine taken approximately 15 cm above the plane of the HMF antenna 104. The two targets were oriented both vertically and horizontally relative to the plane of the HMF antenna 104. FIG. 11 clearly shows that the two targets can be differentiated from each other based solely on their time decay responses. This target differentiation has been demonstrated in other research and forms the basis of target identification and classification. FIG. 11 demonstrates that the sensor system 100 has the capability to measure target time decay responses that are different for different targets, and for identifying the different targets.

III.3 Operation

A description will now be provided as to the operation of the HMF antenna 104 with different receiver configurations. These receiver configurations can be used singly or in combination. We start with simple configurations that show the underlying concepts of the HMF sensor system features and move to more complex receiver configurations that take full advantage of the HMF antenna characteristics.

Figure 12A:
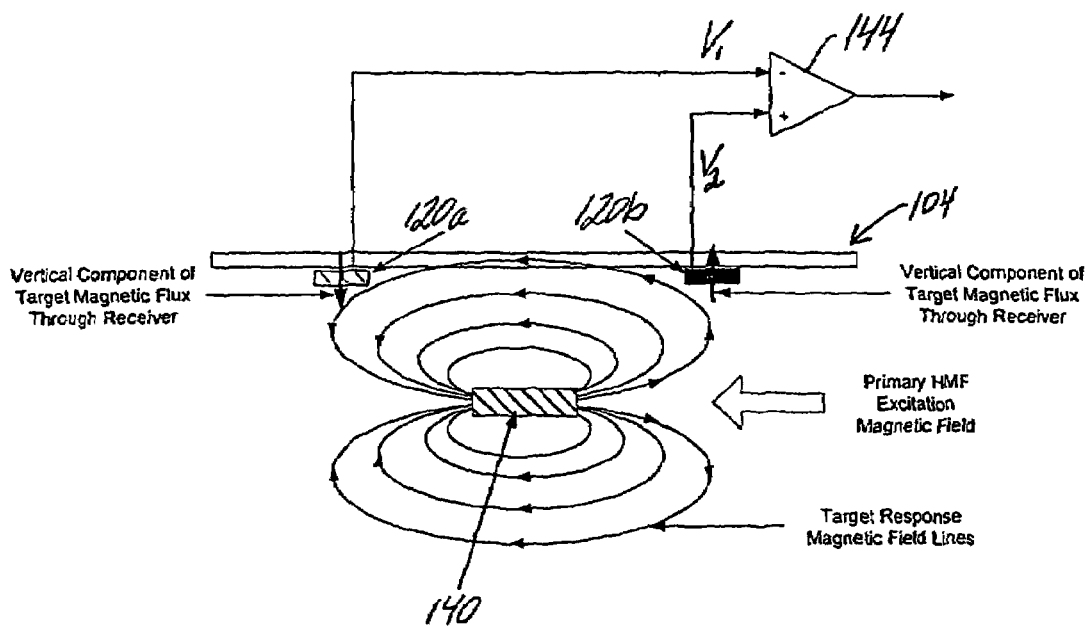
FIG. 12A is a diagram illustrating operation of the HMF antenna where receiver units are vertically oriented.
Figure 12B:
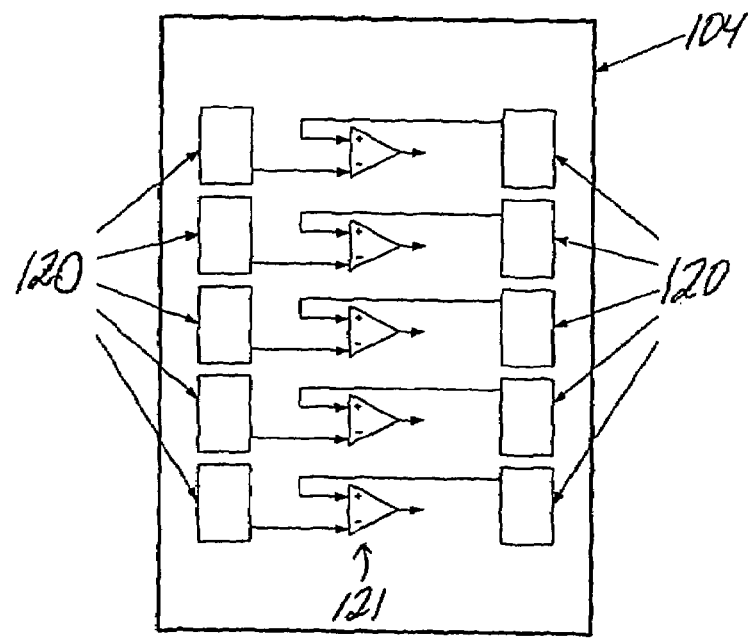
FIG. 12B is a diagram illustrating a vertical receiver array configuration for the receiver units of FIG. 12A.

FIG. 12A is a side view diagram illustrating operation of the HMF antenna 104 where the receiver units 120a and 120b are vertically oriented. FIG. 9B is a top view diagram illustrating a vertical receiver array configuration for the receiver units 120a, 120b of FIG. 9A. Vertically oriented receivers refers to the axis of sensitivity of the receiver, i.e., the receiver is sensitive to vertical magnetic fields. The receiver units 120 are located near the opposite edges of the HMF antenna 104 above the plane of the HMF antenna 104 (toward the direction of the metal target 140) and are connected to differential amplifier 121. Even though the receiver units 120 are illustrated as using an induction coil, it is contemplated that the receiver units 120 can use other types of magnetic sensors.

FIG. 12A shows the metal target 140 located near the centerline of the HMF antenna 104 at some distance from the plane of the HMF antenna 104. The HMF antenna 104 generates a magnetic field in the positive x-direction as indicated by the HMF excitation arrow pointing to the right. When the magnetic field is turned off, the metal target 140 responds by generating a magnetic field that opposes the collapsing magnetic field, i.e., eddy currents in the metal target 140 are generated. FIG. 12A shows conceptually the magnetic field (target response) generated by the metal target's eddy currents. At the left receiver unit 120a, the magnetic flux from the target response is downward in the −z direction, (−Bz). The vertical (z sensitive) magnetic field receiver unit 120a detects this magnetic flux and sends the signal $V_1$ to a differential amplifier's negative input. The differential amplifier is designated by reference numeral 144.

At the same time, the right receiver unit 120b intercepts the magnetic flux from the target response, which is upward, +z direction, (+Bz). The nominally identical right vertical magnetic field receiver unit 120b detects this magnetic flux and sends the signal $V_2$ to the differential amplifier's positive input. The output from the differential amplifier 144 can be written as:

$$V = V_2 - V_1 + N_2 - N_1$$

where $V_1$ is the left receiver unit signal, $V_2$ is the right receiver unit signal, $N_1$ is the electromagnetic (EM) noise (e.g., interference) measured by the left receiver unit 120a and $N_2$ is the EM noise measured by the right receiver unit 120b. Since the EM noise seen by both receiver units 120a, 120b is nominally the same and $V_1 \approx V_2$, the output of the differential amplifier 144 is then, $$V = 2*V_2$$

The EM noise terms cancel and we double our target signal. The amplification of the target signal is dependent on the spatial relationship between the target 140 and the sensor system 100. However, the EM noise cancellation is still effective and allows the sensor system 100 to operate in EM noisy environments.

It is also obvious that the receiver units 120 could be wired together directly to create the same effect as that generated by the differential amplifier 144. This alternate connection of the receiver units 120 is understood in the following discussion. The use of the differential amplifier 144 makes the discussion of signal addition and subtraction clear.

Figure 13A:
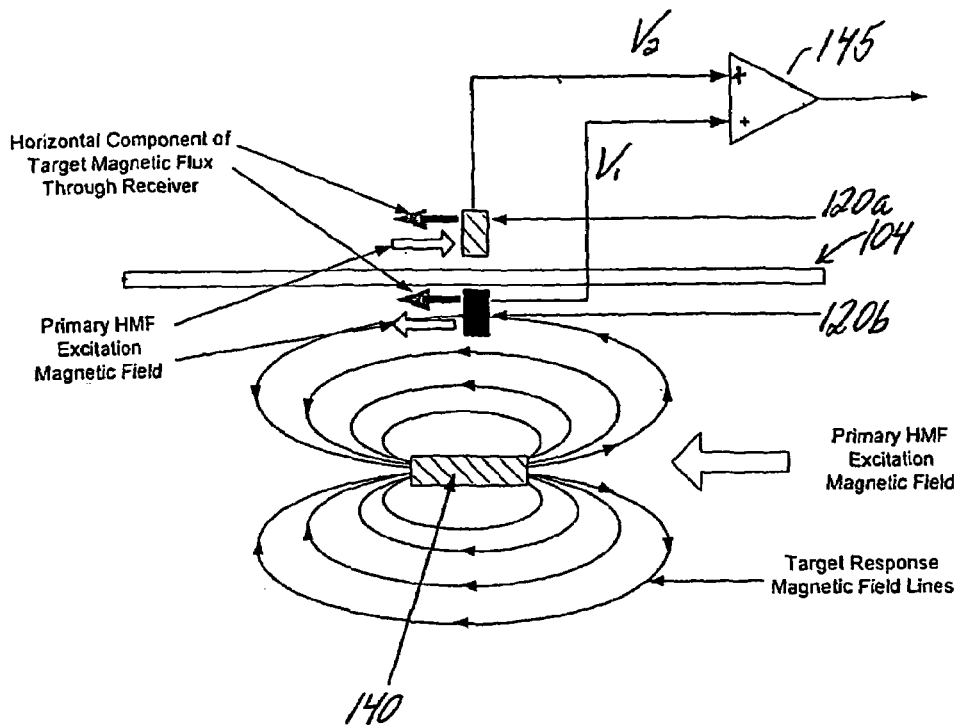
FIG. 13A is a diagram illustrating operation of the HMF antenna where receiver units are horizontally oriented.
Figure 13B:
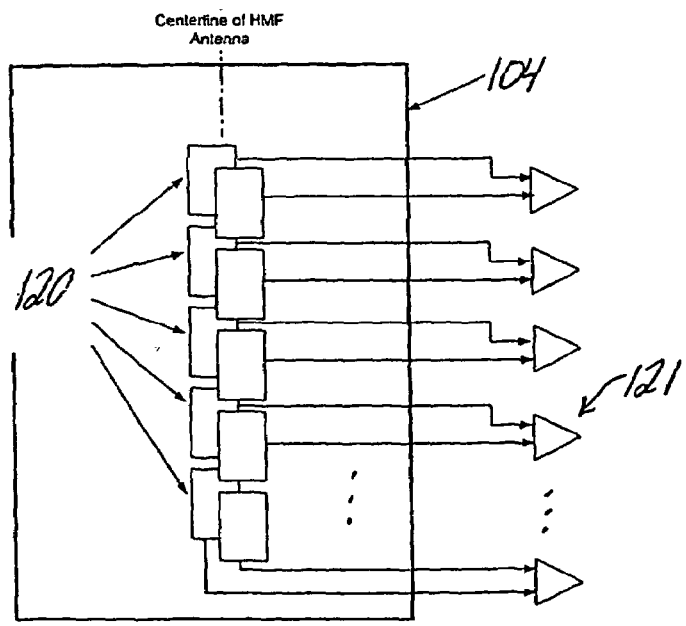
FIG. 13B is a diagram illustrating a horizontal receiver array configuration for the receiver units of FIG. 13A.

FIG. 13A is a side view diagram illustrating operation of the HMF antenna where the receiver units 120a, 120b are horizontally oriented. FIG. 13B is a top view diagram illustrating a horizontal receiver array configuration for the receiver units 120a, 120b of FIG. 13A. Referring back to FIG. 13A, the receiver units 120a, 120b are nominally located along the centerline of the HMF antenna 104. When the target 140 is located directly under the plane of the HMF antenna 104, the target flux is primarily horizontal at the plane of the antenna 104. The horizontal receiver units 120a, 120b detect this flux.

FIG. 13A shows the HMF antenna 104 generating a magnetic field in the negative x-direction as indicated by the HMF excitation arrow pointing to the left. When the magnetic field is turned off, the metal target 140 responds by generating a magnetic field that opposes the collapsing magnetic field, i.e., eddy currents in the metal target 140. FIG. 13A shows conceptually the magnetic field (target response) generated by the metal target's eddy currents. The target response flux at the plane of the HMF antenna 104 is pointing to the left as denoted by the small arrows. The signals from the two receivers units 120a, 120b are preferably summed in an amplifier 145. The signal measured by the receiver units 120*a*, 120*b* can be written as:

$$\text{Signal Output} = R1(T) + R1(N) + R1(A) + R2(T) + R2(N) + R2(A).$$

R1 is the top receiver unit 120*a* and R2 is the bottom receiver unit 120*b*, R1(T) is the top receiver unit's target signal, R1(N) is the top receiver unit's EM noise signal, R1(A) is the top receiver unit's antenna signal, R2(T) is the bottom receiver unit's target signal, R2(N) is the bottom receiver unit's EM noise signal and R2(A) is the bottom receiver unit's antenna signal. If the two receiver units 120*a*, 120*b* are placed symmetrically on the antenna 104, then R1(A)=–R2(A) and the antenna signals cancel when added together by the summing amplifier 145. One is then left with approximately twice the target signal and twice the EM noise signal.

Figure 14:
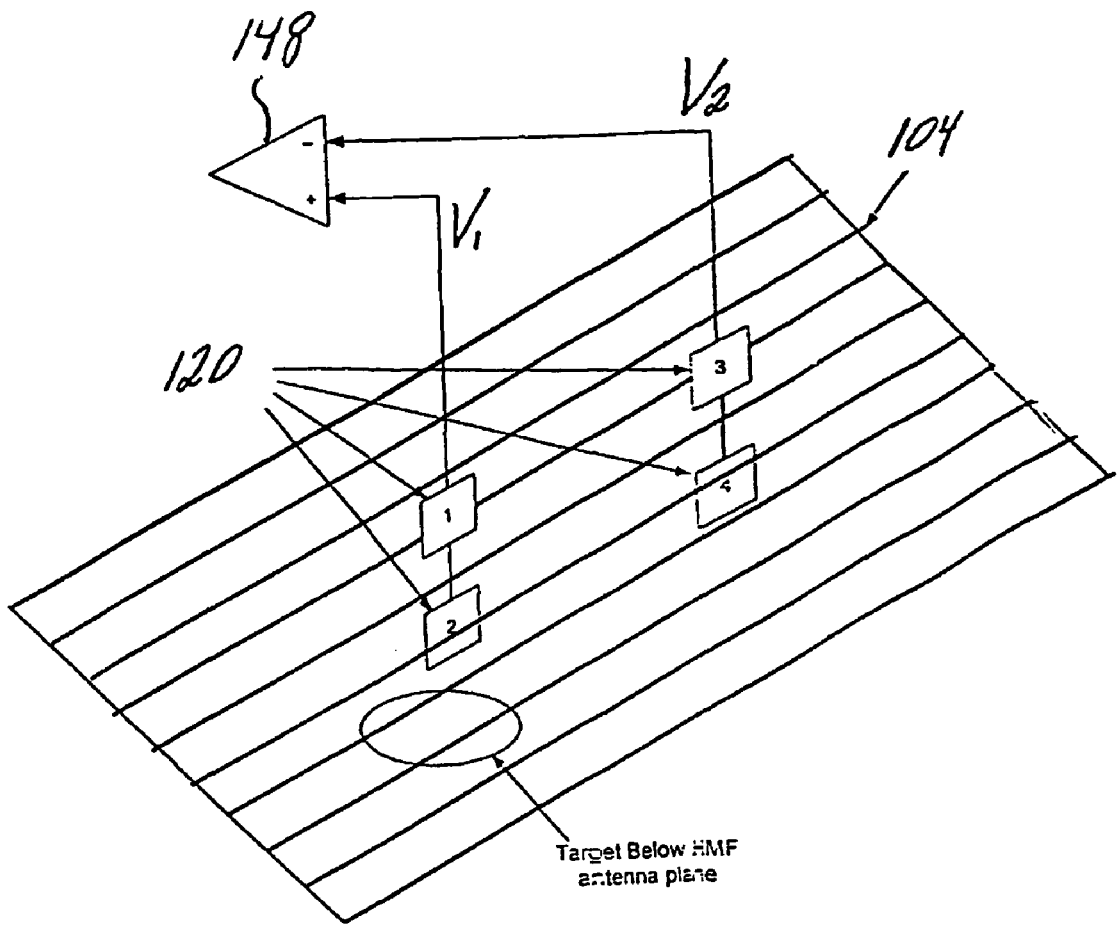
FIG. 14 is a diagram illustrating the horizontal receiver array configuration, the HMF antenna and a differential amplifier.
Figure 15A:
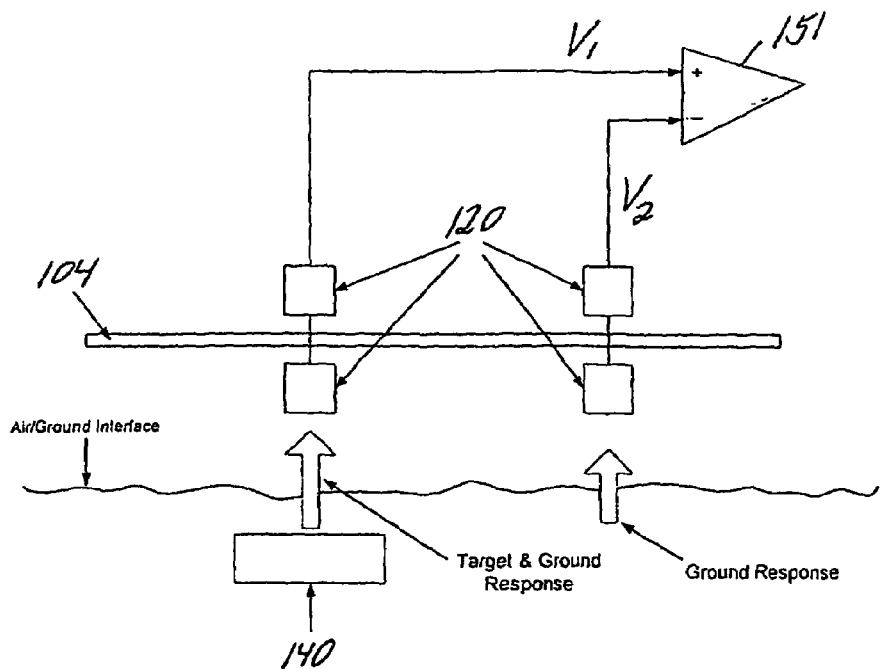
FIG. 15A is a diagram illustrating detection of a metal target using the HMF antenna and the horizontal receiver array configuration.
Figure 15B:
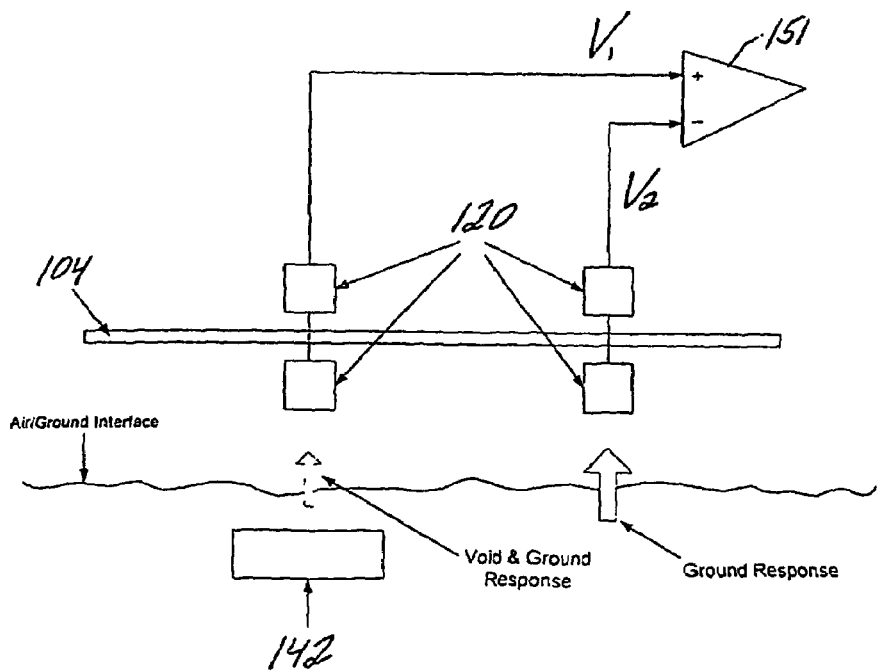
FIG. 15B is a diagram illustrating detection of an underground void using the HMF antenna and the horizontal receiver array configuration.

FIGS. 14–15B illustrate how to reconfigure the receiver units 120*a*, 120*b* in FIG. 13A for both antenna flux cancellation and additionally, flux cancellation from EM noise and the eddy currents generated in the ground (ground response). The feature of ground eddy current cancellation is called ground-balancing and is an important concept for low-metal target and underground void detection.

FIG. 14 is a diagram illustrating the horizontal receiver array configuration having the horizontal receiver units 120 mounted in a differential mode. Receiver unit 1 is mounted on the top side of the HMF antenna 104 and receiver unit 2 is mounted on the bottom side of the HMF antenna 104 as in FIG. 13A. The signals of the two receiver units 1, 2 are summed together and the output is sent to the plus input of differential amplifier 148. Additionally, a second set of identical receiver units 3, 4 are located near the first set, but not directly over the target under study. Their summed output is sent to the negative input of the differential amplifier 148. Using similar notation as above, the output signal of the differential amplifier 148 can be written as:

$$A = R1(T) + R1(N) + R1(A) + R1(G) + R2(T) + R2(N) + R2(A) + R2(G)$$

$$B = R3(N) + R3(A) + R3(G) + R4(N) + R4(A) + R4(G).$$

Where R1 and R3 are the two top receiver units 1, 2 and R2 and R4 are the two bottom receiver units 3, 4; R1(T), R1(N), R1(A), and R1(G) are the first receiver unit's target, EM noise, antenna and ground signals, respectively; R2(T), R2(N), R2(A), and R2(G) are the second receiver unit's target, EM noise, antenna, and ground signals, respectively; R3(N), R3(A), and R3(G) are the third receiver unit's EM noise, antenna, and ground signals, respectively; and R4(N), R4(A), and R4(G) are the fourth receiver unit's EM noise, antenna, and ground signals, respectively.

If the top two pairs of receiver units 1, 2 are placed symmetrically on the antenna 104, then:

$$R1(T) \approx R2(T)$$

$$R1(A) = R3(A) = -R2(A) = -R4(A)$$

$$R1(N) = R3(N) = R2(N) = R4(N).$$

The differential amplifier 148 (or alternatively, differencing via direct connection with wires in reverse order as in the case of counter-wound induction coil receivers) subtracts B from A and:

$$\text{Output} = A - B$$

$$\text{Output} = 2*R1(T) + R1(G) + R2(G) - R3(G) - R4(G).$$

FIG. 15A shows the case of a medium or large metal target 140 that has a response that is larger than the ground response. The relative size of the arrows in FIG. 1 SA indicate the relative response's from the metal and ground. Then, $$\text{Output} = 2*R1(T) \quad R(G) << R(T).$$

Hence, the medium or large metal target 140 is detected by the system 100 and/or an operator.

For the case of a small metal target where the metal response is not large with respect to the ground, then, $$R1(G) \approx R3(G)$$

$$R2(G) \approx R4(G)$$

$$\text{Output} \approx 2*R1(T).$$

The case of an underground void is shown by FIG. 15B, where the underground void is designated generally by reference numeral 142. The ground response of the underground void 142 is less than the ground response without the underground void 142. When the signals are subtracted in differential amplifier 151, the void signal is negative. Accordingly, the system 100 and/or the operator detect the existence of the underground void 142.

If there is an underground void 142 and a small metal content target present, as is the case for a low-metal content mine, the time decay signal will be composed of both negative (void) and positive (metal) signals. The eddy current time decay of a void and metal target are very different. Accurately measuring the time decay history of the target response allows one to separate the void and metal signals. The existence of a coincident metal and void signal is an indication of a low-metal content mine.

IV. Forming the Steerable 3-D Magnetic Field Sensor System

One method to model a metal target is to define a magnetic polarizability tensor $$\vec{M} = \begin{pmatrix} M_x(t) & 0 & 0 \\ 0 & M_y(t) & 0 \\ 0 & 0 & M_z(t) \end{pmatrix}. \quad (3)$$

where the diagonal components of the tensor are the time responses of the target to excitations in an orthogonal reference frame centered on the target. For a loop antenna oriented directly over a target, the antenna only excites the vertical component of the target's time decay response. For accurate target classification, it is desirable to measure all three components of a target's magnetic polarizability tensor. Accordingly, a discussion will now be presented for combining two single HMF sensor systems 100 to form a steerable two-dimensional (2-D) HMF sensor system and then combining a steerable 2-D HMF sensor system with a vertical loop antenna sensor system and forming the steerable 3-D magnetic field sensor system.

Figure 16:
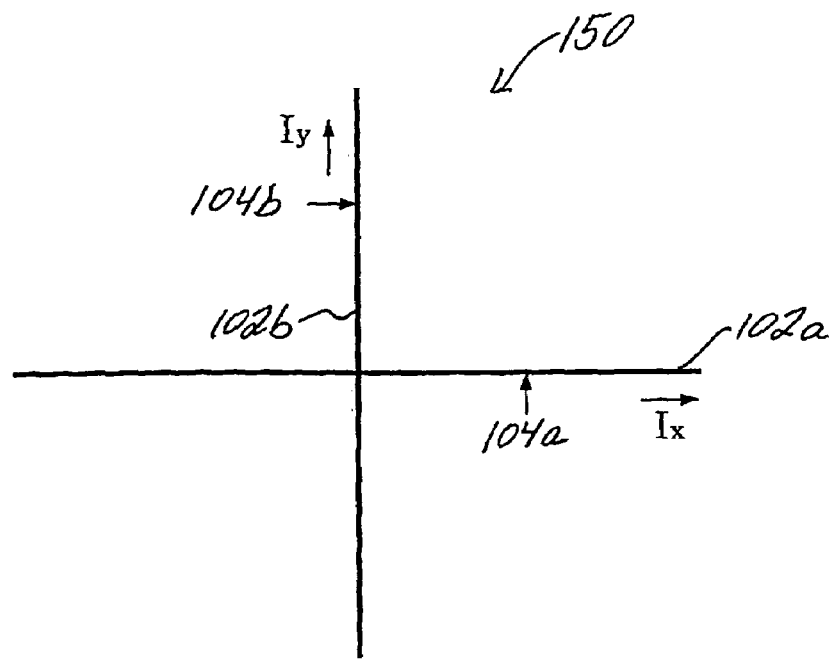
FIG. 16 is a diagram illustrating two HMF antennas at right angles to each other forming a two-dimensional HMF antenna that can generate a horizontal magnetic field which can be steered in any direction.
Figure 17:
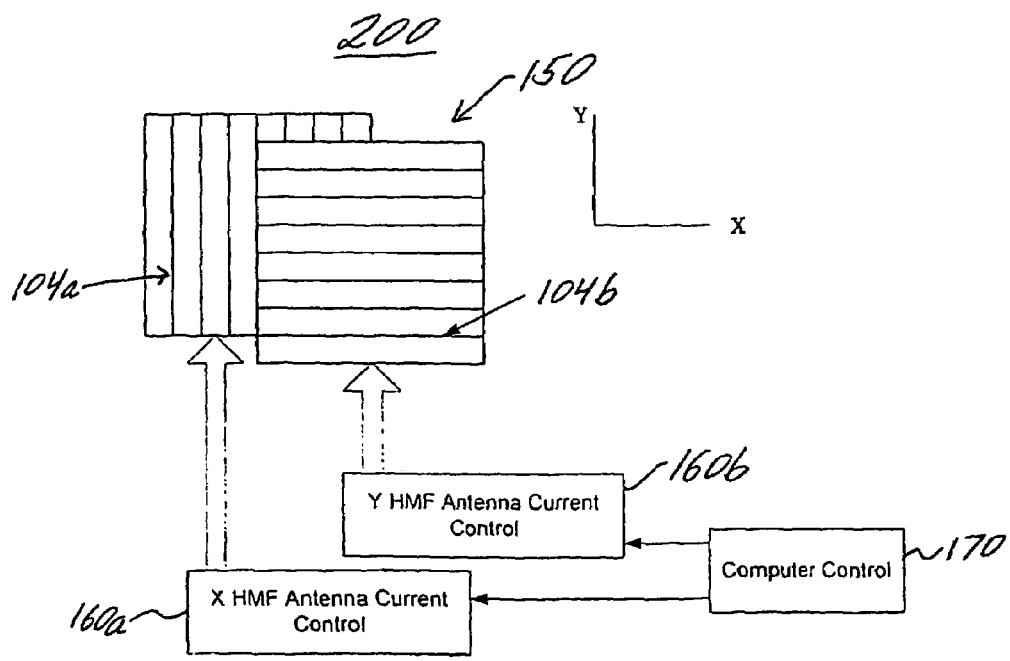
FIG. 17 is a diagram illustrating a steerable magnetic field sensor system having the two-dimensional HMF antenna.

With reference to FIGS. 16 and 17, there are shown two HMF antennas 104*a*, 104*b* at right angles to each other forming a two-dimensional HMF antenna 150 that can generate a horizontal magnetic field which can be steered in any direction in the plane of the antennas 104*a*, 104*b*, not just the direction perpendicular to the current flow in the antenna wires 102, and a diagram of a steerable HMF sensor system 200 having the two-dimensional HMF antenna 150, respectively. FIG. 16 shows one wire 102a representing x-direction HMF antenna 104a with current flow Ix in the x-direction and one wire 102b representing y-direction HMF antenna 104b with current flow Iy in the y-direction.

By controlling the current separately in each HMF antenna 104a, 104b using current control circuitry 160a, 160b under computer control 170 (FIG. 17), one can create a new magnetic field pointed in any direction in the plane of the HMF antennas 104a, 104b. The new magnetic field is given by $B=(Bx^2+By^2)^{1/2}$. The angle of the field is given by $\vartheta=\tan^{-1}[By/Bx]$. It is provided that receiver units 120 are provided adjacent each of the HMF antennas 104a, 104b as described above with reference to FIGS. 8 and 12A–15B.

One skilled in the art would appreciate that additional HMF antennas 104 may be provided to the system 200.

Figure 18:
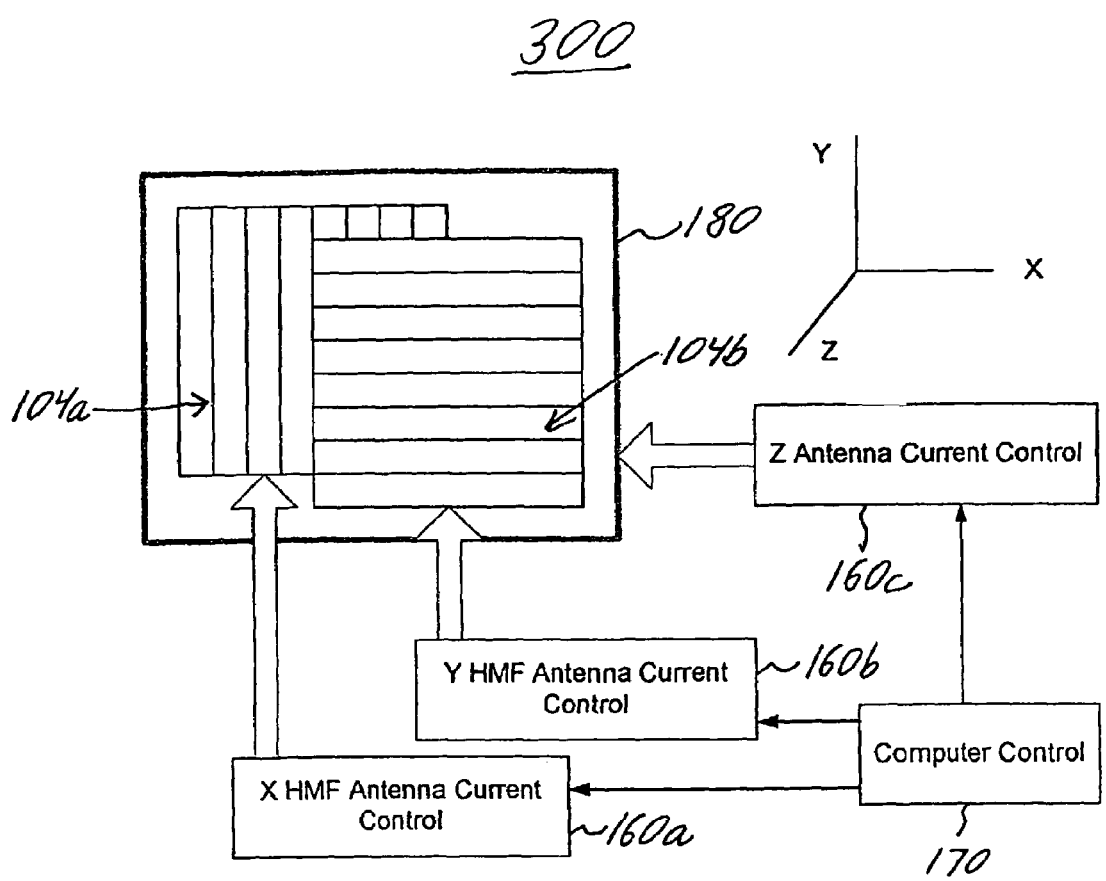
FIG. 18 is a diagram illustrating a steerable magnetic field sensor system having the three-dimensional HMF antenna.

FIG. 18 is a schematic diagram of the steerable 3-D magnetic field sensor system 300 according to the present invention. The sensor system 300 adds to the 2-D steerable HMF sensor system 150 a vertical loop antenna 180, which adds the third dimension to the steerable magnetic field sensor system. Accordingly, the generated magnetic field of the sensor system 300 is a summation of the magnetic field in the x-axis direction generated by the HMF antenna 104a, the magnetic field in the y-axis direction generated by the HMF antenna 104b, and the magnetic field in the z-axis direction generated by the vertical loop antenna 180.

At least one vertical magnetic field receiver (not shown) is understood to be included in the sensor system 300. A z-antenna current control circuitry 160c is also provided which is under computer control 170 for controlling the magnetic field in the z-direction.

Figure 21:
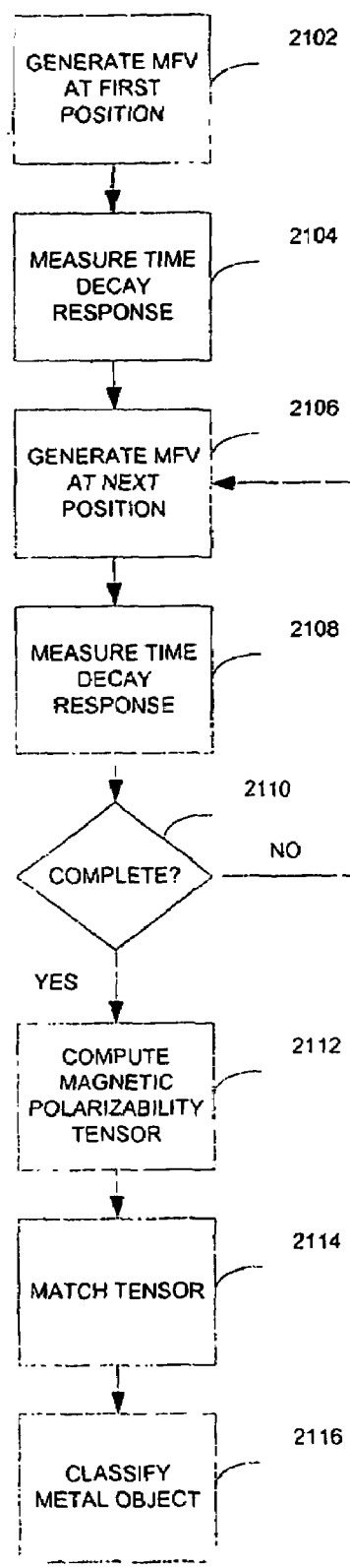
FIG. 21 is a flow chart illustrating a first preferred method for classifying a buried metal object using a steerable 3-D magnetic field sensor system according to the present invention.
Figure 22:
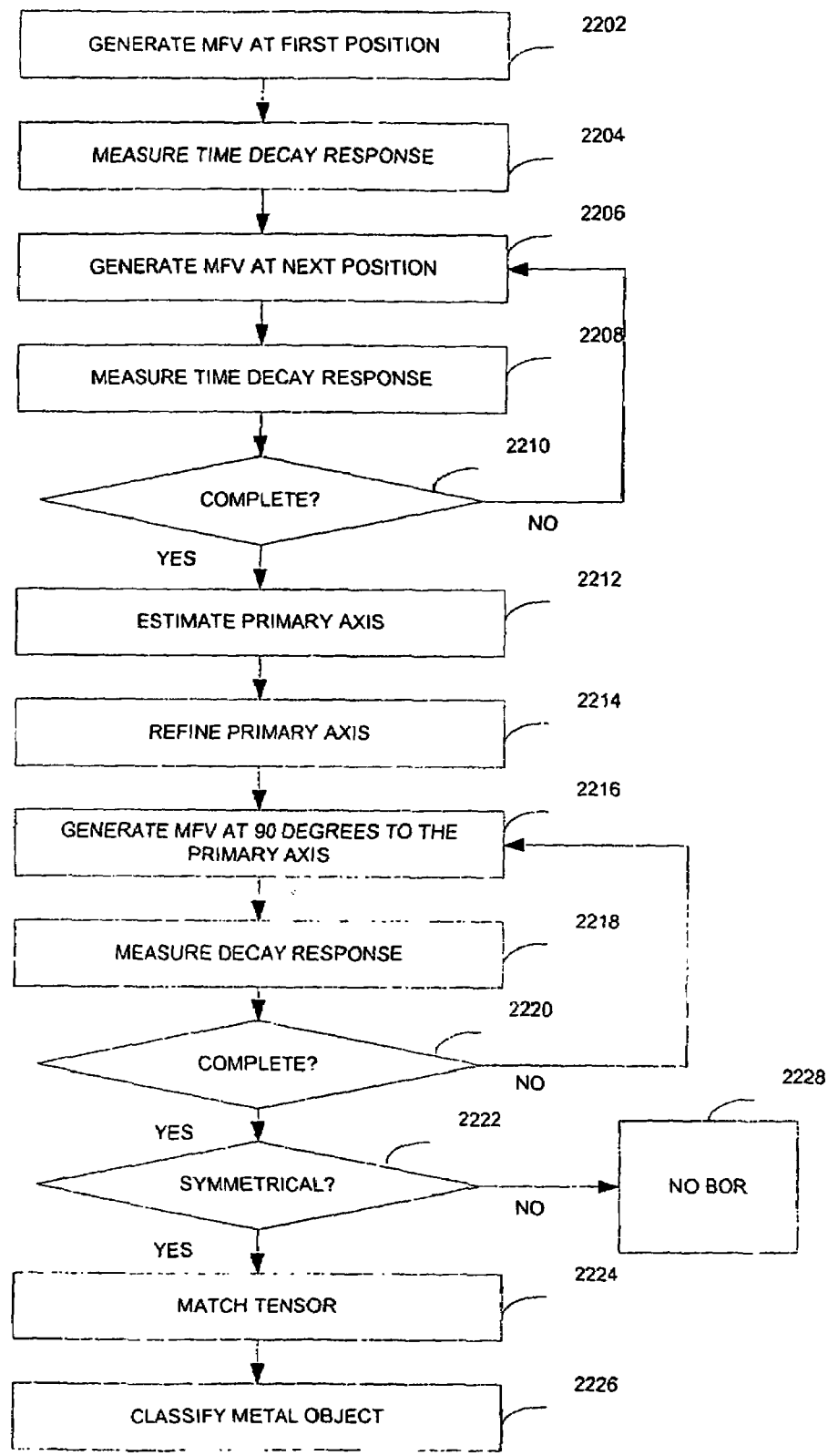
FIG. 22 is a flow chart illustrating a second preferred method for classifying a buried metal object using a steerable 3-D magnetic field sensor system according to the present invention.
Figure 23:
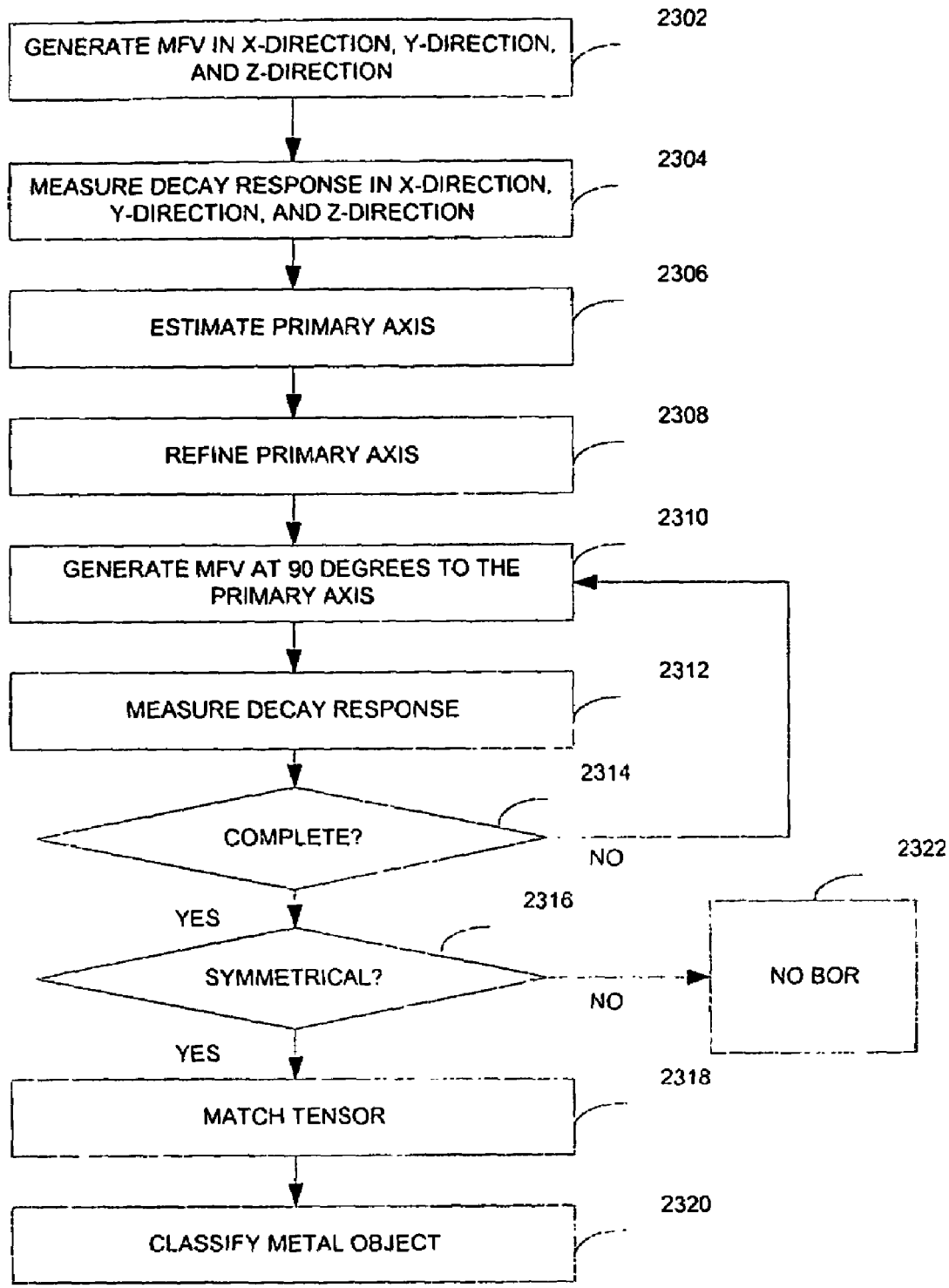
FIG. 23 is a flow chart illustrating a third preferred method for classifying a buried metal object using a steerable 3-D magnetic field sensor system according to the present invention.

VI. Preferred Methods for Utilizing the Steerable 3-D Magnetic Field Sensor System for Metal Target Classification FIGS. 21, 22, and 23 are flow charts illustrating preferred methods for classifying metal objects using a steerable 3-D magnetic field sensor system. Herein below a description will be made of these preferred methods with reference to FIGS. 21–23.

As stated above, for a time-domain, eddy current response sensor system, a metal target can be modeled by defining a magnetic polarizability tensor that contains the target's primary magnetic decay response modes (See Equation (3)), where the diagonal components of the tensor are the time responses of the target to excitations in an orthogonal reference frame centered on the target. A similar expression can be developed for the frequency domain. In an orthogonal XYZ Cartesian coordinate system, $M_x(t)$ is the target's decay response to a magnetic field excitation in the X direction, $M_y(t)$ is the target's decay response to a magnetic field excitation in the Y direction, and $M_z(t)$ is the target's decay response to a magnetic field excitation in the Z direction. For an axially symmetric, or body of revolution (BOR), target, $M_x(t)$ and $M_y(t)$ are equal. The same information can also be expressed in other coordinate systems.

Using a metal target's magnetic polarizability tensor, metal target (or object) classification is accomplished in the following way: (a) Develop a library of magnetic polarizability tensors for targets of interest; (b) Measure an unknown target's magnetic polarizability tensor as given in Equation (3), and (c) Classify the unknown target by matching the measured response to the target library response.

Figure 19:
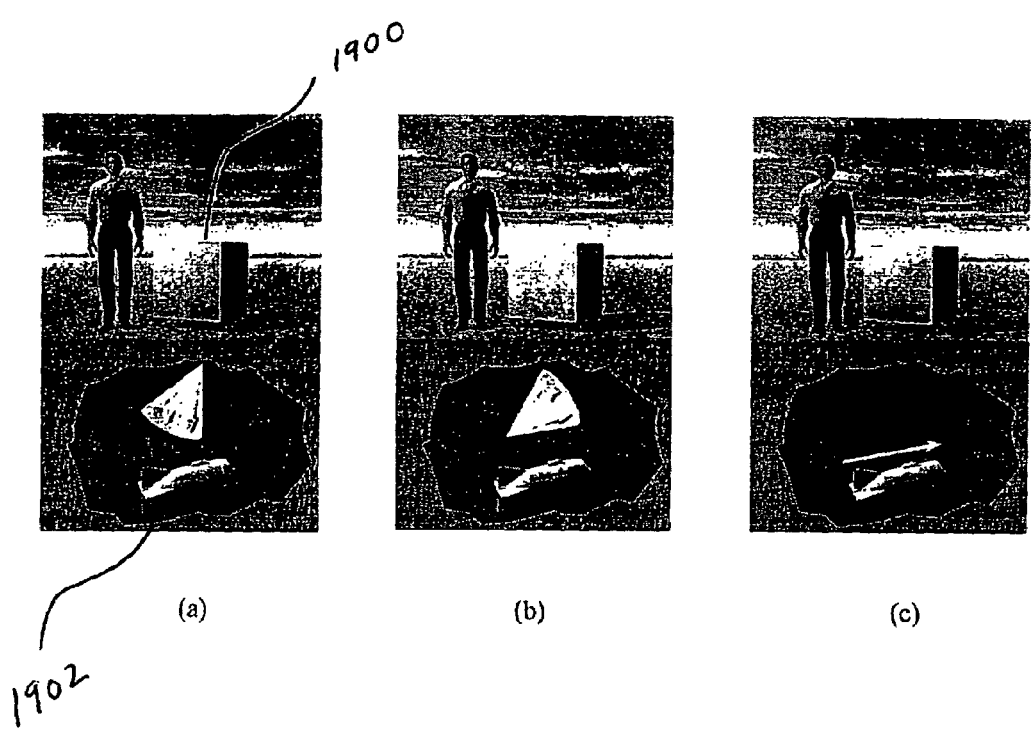
FIG. 19 is a illustrates a an example of detection/classification problem solved by the present invention.

In the detection/classification problem, as illustrated in FIG. 19, the sensor 1900 (3DSMF) has its own XYZ coordinate system that is generally defined by the ground surface (typically XY plane) it sits on. The unknown buried metal target 1902 has its own, body coordinate system with magnetic decay properties that obey Equation (3). In addition, the buried metal can be oriented in any direction relative to the sensor. For optimal target classification, it is beneficial to rotate the sensor's coordinate system into the target's body coordinate system so that measurements can be made on the buried target's magnetic polarization tensor elements directly. Since one of the major features of the 3DSMF invention is the fact that it can orient a target excitation magnetic field vector in any direction, the sensor's coordinate system can be rotated into the target's body coordinate system.

FIG. 21 is a flow chart illustrating a first preferred method for classifying a buried metal object using a steerable 3-D magnetic field sensor system. Referring to FIG. 21, a magnetic field vector (MFV) of a three-dimensional steerable magnetic field (3DSMF) system generates a magnetic field vector (MFV) at a first position over the buried metal object in step 2102 (e.g., along the X-axis, with no Y or Z-axis components). In step 2104, the 3DSMF system measures a time decay response at the first position. In steps 2106 and 2108, the same procedure performed in steps 2102 and 2104 is repeated at a next position. That is, a time decay is measured in a different excitation direction. This process is repeated until it is determined in step 2110 that all excitation directions have been measured.

After it is determined in step 2110 that all the time decays have been measured, the measured information is used to compute a magnetic polarizability tensor for the metal object in step 2112. One method for computing the magnetic polarizability tensor is to use a target search algorithm that orders the time decay measurements in a standard fashion. One standard form places the maximum time decay measurement at the center of a two dimensional matrix of time decay measurements. Referring to FIG. 24A, the original time decay measurements as a function of angular measurement are illustrated. The rows and columns represent angles measured in a spherical ordinate system. The maximum time decay is at some angle α and θ. Using a conventional rotation operation known in the art, the original matrix of time decay data is rotated such that the maximum time decay value is placed at the center of the matrix as shown in FIG. 24B, the time decay matrix in standard form. Other criterion could be used to define other standard forms. This particular standard form relies on a property of the unknown metal target, i.e., the longest decay time. The new data matrix is now in a time-decay space of the target where the data is rotated into a convenient coordinate system that is target centric. For targets that have principal axes that have long decay times along the principle (e.g., longest physical dimension) axis the rotation operation has placed the data matrix into a coordinate system that is aligned with the principal axis of the target. At this point the unknown target's data matrix is aligned in a standard form with the maximum decay time at the center. However, it is not known at what angle or rotation the unknown target is relative to the sensor's coordinate system. It is necessary to rotate the unknown target matrix, using standard mathematical techniques. The unknown target's time decay matrix is compared to the target library. The target library is also in the standard form where the maximum time decay is at the center of the matrix and the orientation of the matrix is in some convenient coordinate system of the sensor. Since the library and unknown target are measured with the same type of sensor and at the same angular measurement points, it is possible to step through the different angles to see if there is a match between the unknown and targets in the library. The matching can be accomplished with standard classification techniques such as linear least squares fitting and/or other statistical measures of goodness of fit. A simple example helps to explain: take a square peg and a square hole; the peg is aligned to be along the axis of the hole but must now be rotated to fit into the hole. With the magnetic polarizability tensor of the buried metal object, a comparison search is then performed in an object library or data base, which contains a plurality of known magnetic polarizability tensors of objects, in step 2114. By matching the computed magnetic polarizability tensor of the buried object with a stored magnetic polarizability tensor in step 2114, it is possible to classify the buried metal object in step 2116.

While the first preferred method described above with regards to FIG. 21 is effective in classifying a buried metal object, as stated above, steps 2106 and 2108 must be repeated until all angular directions are measured. For example, using 5 degree incremental changes in MFV direction would result in hundreds of necessary measurements. This part of the process is very time consuming and may be eliminated in certain instances.

As indicated earlier, a major objective of the present invention is to identify metal targets, such as unexploded ordnance (UXO), underground utilities, high metal content landmines and low metal content landmines buried in the soil (or visually obscured) based on the electromagnetic response of the target to a time-domain wide bandwidth electromagnetic spectrum. Many of the metal targets/objects have bodies of revolution (BOR). That is, a large number of the buried metal objects have symmetrical body shapes. FIGS. 22 and 23 are flow charts illustrating preferred methods for classifying metal objects using a steerable 3-D magnetic field sensor system, taking advantage of a buried metal object's body symmetry.

Figure 20:
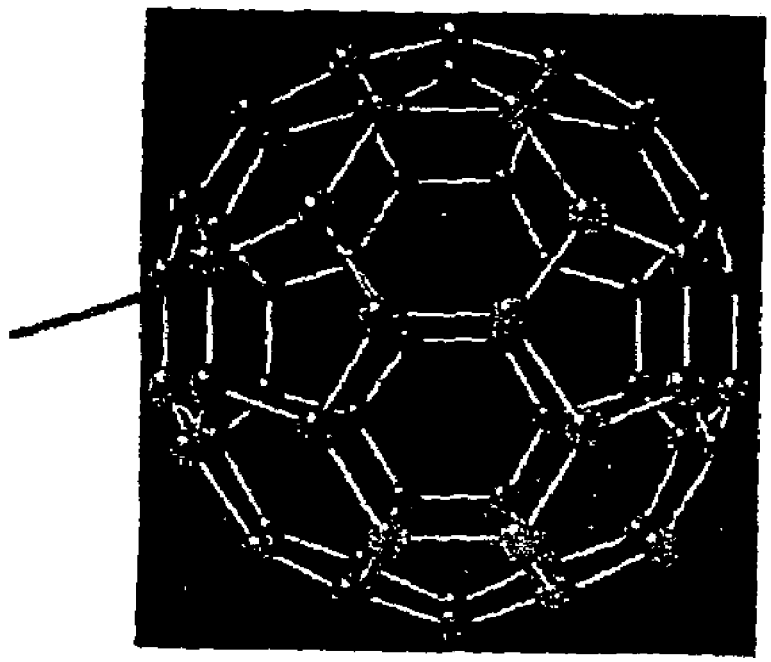
FIG. 20 is a conceptual sketch of magnetic field search directions in SD space using a $C_{60}$ molecule as a 3D model.

FIG. 22 is a flow chart illustrating a method for identifying a buried metal object with a body of revolution (BOR) using a three-dimensional steerable magnetic field (3DSMF) system and a more intelligent search approach. As stated above, many buried metal objects have body symmetry. Due to symmetry, only a half-space of the buried object needs to be considered. Next, the half-space is divided into roughly equal angular segments such as those represented by a $C_{60}$ molecule shown in FIG. 20. Using this as an example, it is only necessary to scan through about 30 MFV directions. This approach gives a starting point to find a primary axis, the direction where the time decay is a maximum. Analyzing this data, it then possible to zero-in on the true primary axis with a few additional measurements. Once the primary axis is found, the MFV can be changed to the cross-axis direction in the target's reference frame (TRF). The MFV then can be rotated in the TRF. If the time decays are equal when the MFV is rotated around the target's primary axis, the object has a BOR. The TRF primary axis and BOR time decays are the magnetic polarizability tensor elements for the object. Therefore, it is possible to classify the target by comparing the measured target time decay signatures to a library of time decay signatures. This procedure will now be described in more detail herein below with reference to FIG. 22.

In step 2202, the 3DSMF system generates a magnetic field vector (MFV) at a first MFV position above the buried metal object (e.g., along the X-axis, with no Y or Z-axis components). The 3DSMF system measures a time decay response at the first MFV position in step 2204. In step 2206 the 3DSMF system generates a MFV at a next MFV position above the buried metal object and measures a time decay response at the next MFV position in step 2208. Step 2206 and 2208 are repeated until it is determined that a predetermined range of measurements of time decay responses of the buried metal object is completed in step 2210. For example, a check is made to determine if data has been collected from the 30 pre-selected excitation directions.

After the predetermined range of measurements is obtained, the 3DSMF system estimates a primary axis of the buried metal object from the predetermined range of measurements of time decay responses of the buried metal object in step 2212. This can be accomplished by processing the data with a primary axis estimation algorithm. Next, the 3DSMF system refines the primary axis by generating and measuring additional MFVs and time decay responses, respectively, around the estimated primary axis in step 2214. The 3DSMF system generates an MFV at a first MFV position 90 degrees to the refined primary axis (a secondary axis) in step 2216 and then measures a time decay response at the first MFV position 90 degrees to the refined primary axis in step 2218. Once the primary axis is found, the sensor's coordinate system is now aligned along the target's primary axis or the target's reference frame (TRF). Steps 2216 and 2218 are repeated until it is determined that a predetermined number of measurements of time decay responses 90 degrees to the refined primary axis of the buried metal object are completed in step 2220. Data is collected in directional increments around the primary axis direction or TRF. Because we are looking for symmetry, the number of data collection directions can be relatively few, e.g., 8 directions.

Once the predetermined number of measurements of time decay responses 90 degrees to the refined primary axis of the buried metal object are completed, the 3DSMF system tests the predetermined number of measurements of time decay responses 90 degrees to the refined primary axis of the buried metal object for symmetry in step 2222. If the predetermined number of measurements of time decay responses 90 degrees to the refined primary axis of the buried metal object are symmetrical, the buried metal object has a BOR. At this point the primary axis decay response and the secondary axis decay response have been measured. Equation (3) has now been measured directly without resorting to a complex algorithm that "inverts" the data set for target classification. Therefore, the 3DSMF system identifies the buried metal object by matching one of the predetermined number of measurements of time decay responses 90 degrees to the refined primary axis of the buried metal object to a known magnetic polarizability tensor of an object in steps 2224 and 2226.

If it is determined that the predetermined number of measurements of time decay responses 90 degrees to the refined primary axis of the buried metal object are not symmetrical in step 2222, and therefore does not have a BOR, the measured information may still be useful since the secondary axis responses could possibly be used for target classification via the target library. This would be the case for example, if the target was an elongated square box. There would exist a primary axis along the long dimension of the box, but the secondary axis would not have symmetric time decay values. However, the time decay values still would be unique to the box and by a rotation operation, one would be able to place the measurements in a standard form that could be used for classification. One standard form would be to place the maximum time decay response at some convenient rotation angle like 0 degrees, i.e., along the x-axis.

Using the above-described method of FIG. 22, a rough order or magnitude estimate for the time to classify a target can be developed as follows. Assume that the sensor operates at a pulse repetition frequency (PRF) of about 25 cycles per second (it takes about 20 ms for a large target's eddy currents to decay to about zero). Averaging 50 target pulses during the preliminary primary axis search, it will take about 2 seconds per angle. Thirty search angles will take 60 seconds. From these angular measurements, the target's primary axis direction can be estimated. Next, the above steps are repeated with 100 target pulses averaged together to find a better estimate of the primary axis. Scanning 15 angles to localize the primary axis may take another 60 seconds. Once the target's primary axis is found, the MFV is rotated orthogonal to the primary axis and another 6 angles are measured around the primary axis, which would add another 12 seconds to the measurement cycle. Adding up the time estimates and adding some additional time for data acquisition overhead, it may take about 3 minutes to classify a target, which is considerably faster than the method illustrated in FIG. 21.

A method to improve this time, in the present invention, is described in a third preferred method illustrated in FIG. 23. In FIG. 23, the 3DSMF system generates a magnetic field vector (MFV) in an X-direction, a Y-direction, and a Z-direction above the buried metal object in step 2302, and then measures a time decay response in the X-direction, the Y-direction, and the Z-direction in step 2304. The measured time decay responses in the X-direction, the Y-direction, and the Z-direction are then used to estimate a primary axis of the buried metal object in step 2306. The estimated primary axis is determined from the measured decays in the X-direction, the Y-direction, and the Z-direction using an inversion algorithm. The remaining procedure of the third method illustrated in FIG. 23 is identical to that already described in FIG. 22 and will not be described again. That is, steps 2308 through 2320 in FIG. 23 correspond to steps 2214 through 2228.

As described above the present invention provides preferred methods for classifying buried metal objects using a steerable 3-D magnetic field sensor system.

While the present invention has been shown and described with reference to certain preferred methods thereof, it will be understood by those skilled in the art that various changes in form and details may be made therein without departing from spirit and scope of the appended claims.

What is claimed is:

1. A method for identifying a buried metal object using a three-dimensional steerable magnetic field (3DSMF) system, comprising:
    (a) generating a magnetic field vector (MFV) at a first MFV position above the buried metal object;
    (b) measuring a time decay response at the first MFV position;
    (c) generating a MFV at a next MFV position above the buried metal object;
    (d) measuring a time decay response at the next MFV position; and
    (e) repeating steps (c) and (d) until a complete 360-degree measurement of time decay responses of the buried metal object is completed.

2. The method according to claim 1, further comprising processing all measured time decay responses with a target search algorithm to determine a magnetic polarizability tensor of the buried metal object.

3. The method according to claim 2, further comprising identifying the buried metal object by matching the magnetic polarizability tensor of the buried metal object to a known magnetic polarizability tensor of an object.

4. The method according to claim 3, wherein the known magnetic polarizability tensor of an object is stored in an object library including a plurality of known magnetic polarizability tensors of objects.

5. A method for identifying a buried metal object having a body of revolution (BOR) using a three-dimensional steerable magnetic field (3DSMF) system, comprising:
    (a) generating a magnetic field vector (MFV) at a first MFV position above the buried metal object;
    (b) measuring a time decay response at the first MFV position;
    (c) generating a MFV at a next MFV position above the buried metal object;
    (d) measuring a time decay response at the next MFV position; and
    (e) repeating steps (c) and (d) until a predetermined range of measurements of time decay responses of the buried metal object is completed.

6. The method according to claim 5, further comprising (f) estimating a primary axis of the buried metal object from the predetermined range of measurements of time decay responses of the buried metal object.

7. The method according to claim 6, further comprising (g) refining the primary axis by generating and measuring additional MFVs and time decay responses, respectively, around the estimated primary axis.

8. The method according to claim 7, further comprising:
    (h) generating a MFV at a first MFV position 90 degrees to the refined primary axis;
    (i) measuring a time decay response at the first MFV position 90 degrees to the refined primary axis;
    j) generating a MFV at a next MFV position 90 degrees to The refined primary axis;
    (k) measuring a time decay response at the next MFV position; and
    (l) repeating steps (j) and (k) until a predetermined number of measurements of time decay responses 90 degrees to the refined primary axis of the buried metal object is completed.

9. The method according to claim 8, further comprising:
    (m) testing the predetermined number of measurements of time decay responses 90 degrees to the refined primary axis of the buried metal object for symmetry; and
    (n) if the predetermined number of measurements of time decay responses 90 degrees to the refined primary axis of the buried metal object are symmetrical, identifying the buried metal object by matching one of the predetermined number of measurements of time decay responses 90 degrees to the refined primary axis of the buried metal object to a known magnetic polarizability tensor of an object.

10. The method according to claim 9, wherein the known magnetic polarizability tensor of an object is stored in an object library including a plurality of known magnetic polarizability tensors of objects.

11. A method for identifying a buried metal object with a body of revolution (BOR) using a three-dimensional steerable magnetic field (3DSMF) system, comprising:
    (a) generating a magnetic field vector (MFV) in an X-direction, a Y-direction, and a Z-direction above the buried metal object;
    (b) measuring a time decay response in the X-direction, the Y-direction, and the Z-direction; and
    (c) estimating a primary axis of the buried metal object from the measured time decay responses in the X-direction, the Y-direction, and the Z-direction.

12. The method according to claim 11, further comprising (d) refining the primary axis by generating and measuring additional MFVs and time decay responses, respectively, around the estimated primary axis.

13. The method according to claim 12, further comprising:
(e) generating a MFV at a first MFV position 90 degrees to the refined primary axis;
(f) measuring a time decay response at the first MFV position 90 degrees to the refined primary axis;
(g) generating a MFV at a next MFV position 90 degrees to the refined primary axis;
(h) measuring a time decay response at the next MFV position 90 degrees to the refined primary axis; and
(i) repeating steps (g) and (h) until a predetermined number of measurements of time decay responses 90 degrees to the refined primary axis of the buried metal object is completed.

14. The method according to claim 13, further comprising:
(j) testing the predetermined number of measurements of time decay responses 90 degrees to the refined primary axis of the buried metal object for symmetry; and
(k) if the predetermined number of measurements of time decay responses 90 degrees to the refined primary axis of the buried metal object are symmetrical, identifying the buried metal object by matching one of the predetermined number of measurements of time decay responses 90 degrees to the refined primary axis of the buried metal object to a known magnetic polarizability tensor of an object.

15. The method according to claim 14, wherein the known magnetic polarizability tensor of an object is stored in an object library including a plurality of known magnetic polarizability tensors of objects.

* * * * *